United States Patent
Kita et al.

(10) Patent No.: US 6,917,964 B2
(45) Date of Patent: Jul. 12, 2005

(54) SYSTEM AND METHOD FOR AUTOMATICALLY CONFIGURING NETWORK SETTINGS ON A COMPUTER TERMINAL VIA A NETWORK INTERFACE CARD

(75) Inventors: Kazuhiro Kita, Kanagawa (JP); Miwako Yuasa, Kanagawa (JP)

(73) Assignee: Sony Corporation, Tokyo (JP)

( * ) Notice: Subject to any disclaimer, the term of this patent is extended or adjusted under 35 U.S.C. 154(b) by 548 days.

(21) Appl. No.: 10/050,328

(22) Filed: Jan. 15, 2002

(65) Prior Publication Data

US 2004/0006648 A9 Jan. 8, 2004

Related U.S. Application Data

(63) Continuation of application No. PCT/JP01/04082, filed on May 16, 2001.

(30) Foreign Application Priority Data

May 16, 2000 (JP) ........................................ 2000-143822

(51) Int. Cl.[7] .............................................. G06F 13/00
(52) U.S. Cl. ........................ 709/204; 709/227; 709/228
(58) Field of Search ................................. 370/259, 260, 370/261; 709/204, 205, 220, 222, 227, 228, 200, 201; 345/751, 752, 753, 754

(56) References Cited

U.S. PATENT DOCUMENTS 6,615,239 B1 * 9/2003 Berstis ....................... 709/204

FOREIGN PATENT DOCUMENTS

EP 0 998 094 A2 3/2002

* cited by examiner

Primary Examiner—Robert B. Harrell
(74) Attorney, Agent, or Firm—Reed Smith LLP

(57) ABSTRACT

A system and method for automatically configuring network settings on a computer terminal via a network interface card so that the computer terminal can communicate on a local area network, without requiring users to manually input the network settings. A network interface card is inserted into a computer terminal device. The network interface card automatically determines whether the computer terminal should be configured as host server or a client based on whether another host server is detected on the network. Based on this determination, the network interface card communicates with the host server and receives network configuration information and automatically sets the network settings for the computer terminal. A further embodiment of the invention includes pre-loading a presentation data application program on the network interface card, such that each terminal in the network can display a received presentation or transmit a presentation to the other terminals.

20 Claims, 18 Drawing Sheets

| Address of Transmission Destination | Address of Transmission Source | Following Bytes | Data or Command | Checksum |

Poling end
Request IP Address
Complete set IP Address

SYSTEM AND METHOD FOR AUTOMATICALLY CONFIGURING NETWORK SETTINGS ON A COMPUTER TERMINAL VIA A NETWORK INTERFACE CARD

CROSS-REFERENCE TO RELATED APPLICATIONS

This is a continuation of International Application PCT/JP01/04082, with an international filing date of May 16, 2001, which was not published under English under PCT Article 21(2).

BACKGROUND OF INVENTION

1. Technical Field

The present invention relates to a network interface card attached to an information terminal device such as a personal computer, a network conference terminal device using such a network interface card, and a network conference system using this network conference terminal device.

2. Background Art

Network I/F (interface) cards that are PC cards based on the PCMCIA standards (Personal Computer Memory Card Interface Adapter) and are capable of connecting personal computers to a LAN (local area network) are becoming widely utilized. When this type of network interface card is inserted into a PC card slot of a personal computer, it is possible to connect the personal computer to a LAN.

In order to connect a personal computer to a LAN, it is necessary to set in advance network configuration settings for connecting the personal computer to the LAN (hereinafter referred to as a "network setting"). This network setting contains setting information of an IP address (identification information and location information for controlling a path) of such personal computer in the LAN and a setting of an IP address of a DNS server (server for providing a translation between IP addresses and domain names).

FIG. 1 shows a personal computer to which a conventional network interface card is connected and to which reference will be made in explaining the function used to execute the network setting. In an operating system (e.g., Windows 95 or Windows 98 ("Windows" is a registered trademark)) of a personal computer, there is support for setting the network configuration settings. This network setting function contains a component that displays a network setting interface in order to execute a network setting based on a user's input operations.

On the other hand, a device driver, which is software to control a conventional network interface card, does not contain a network setting function. For this reason, a network setting of a personal computer is executed by using a network function of the operating system of the personal computer.

FIG. 2 shows an operational procedure executed by users to connect the personal computer shown in FIG. 1 to the LAN. Users insert the network interface card into the personal computer and activate the operating system of the personal computer to display a control panel on the screen of the personal computer. Then, users select a network setting icon from the control panel and enter data in accordance with instructions of a network setting interface displayed when users select the corresponding icon. Thereafter, users restart the operating system and the network setting is completed.

As described above, in order to attach a conventional network interface card to a personal computer so that the personal computer may be connected to a LAN, users have to activate the operating system of the personal computer to make operations to set the network setting. Accordingly, these operations are difficult to understand for users who have little knowledge of the operating system. When a notebook size personal computer, for example, is carried into various places and is connected to a LAN, the above operations must be made at every place so that such operations become troublesome even for users who are have knowledge of the operating system.

Under circumstances in which a DHCP protocol is used, which is a protocol capable of managing information to execute the network setting in a centralized fashion when supported by the operating system, since the operating system side automatically executes the network setting processing, users need not do operations to set the network setting. However, in actual practice, most users have personal computers in which the DHCP protocol is not supported by the operating system.

In view of the aforesaid situation, the first problem to be solved by the present invention is that, when the network interface card is attached to the personal computer to thereby connect the personal computer to a LAN, even though the DHCP protocol is not supported by the operating system of the personal computer, the network settings can be set without troubling users.

In addition, in places such as various kinds of meetings, presentations and lectures (these meetings, presentations and lectures will be generally referred to as a "conference" in this specification), heretofore, the presentation is made by displaying presentation data such as images and illustrations on a projector. However, depending on the scale of the conference hall and the size of the screen of the projector, those who are seated away from the projector cannot always watch presentation data displayed on the screen.

In recent years, presentations that can be displayed on a personal computer connected to a LAN at each seat in the conference hall are becoming increasingly common. As described above, if the conference is held by effectively utilizing the LAN, then participants at all seats are able to watch satisfactorily watch the presentation data.

However, if a personal computer is provided at each seat as part of the conference room equipment, then it is unavoidable that the cost of equipment in the conference hall will increase. If notebook size personal computers are brought by the participants of the conference and are connected to the LAN within the conference hall, then the cost of equipment can be reduced. In this case, however, the operations for setting the network settings become problematic for the participants.

In view of the aforesaid issue, the second problem to be solved by the present invention is that a conference system using a LAN can be constructed without increasing the cost of equipment of the conference hall and also without imposing a burden on the participants in order to execute the network setting.

SUMMARY OF THE INVENTION

In order to solve the first problem noted above, a new network interface card that can be attached to an information terminal device, such as a personal computer, is disclosed. This network interface card includes a connector for interfacing the information terminal device to a LAN and a network configuration manager for requesting that a host server of the LAN transmits network configuration information necessary for establishing a network connection to connect the information terminal device to the LAN.

This network interface card includes not only the connector for connecting the information terminal device to the LAN (i.e., the function to connect the information terminal device to the LAN) but also the configuration manager for setting the network configuration information. Then, when this card is attached to the information terminal device, the configuration manager requests that the host of the LAN transmits the setting information necessary for establishing the network connection and sets the network configuration information by using the information transmitted from the host.

As described above, when the network interface card is attached to the information terminal device, since the network is automatically set by the configuration manager, the network can be set without inconveniencing the users.

Therefore, in a conference using a LAN, for example, if the network interface cards are pre-configured in the conference hall, and these network interface cards are attached to the information terminal devices such as notebook size personal computers brought by those who attend the conference, the network settings can be set without troubling those who attend the conference. Simultaneously, the cost of equipment in the conference hall can reduced, unlike the case in which the information terminal device such as the personal computer is provided at each seat as fixed equipment.

This network interface card further includes a processor for determining whether the information terminal device is a host server or a client of the LAN, and for transmitting requested network configuration information to the client if it is determined that the information terminal device is the host. The network configuration manager requests the setting information from the host, if it is determined that the information terminal device is a client.

Additionally, the host server of the LAN also has an information terminal with the network interface card attached. Accordingly, the system of the present LAN can be constructed without providing an exclusive-device as a host server independent of this network interface card and the information terminal device. Therefore, in the conference using the LAN, for example, the cost of equipment in the conference hall can be even further reduced.

Based on whether the network interface card is attached to the information terminal device and if an inhibiting command is not received through the LAN, the information terminal device is determined as the host, and the information terminal device transmits an inhibiting command to any other information terminal devices, such that no other information terminal devices are determined as the host server on the LAN. As a result, the first information terminal device to which the network interface card is attached within the area of the LAN is determined as the host.

This network interface card further includes a processor for requesting from the host server a presentation right and transmitting presentation data to the host and other clients. Either the host server or any of the clients may request a presentation right.

Consequently, in the conference using the LAN, for example, those who attend the conference can get the presentation right by operating the information terminal devices and can transmit presentation data. Therefore, those who attend the conference can make a presentation without leaving their seats.

When the connector connects the information terminal device to a wireless LAN, the network interface card further includes a processor for receiving, in a polling system, a request from a client in which the setting of the network was completed based on the fact that the information terminal device was determined as the host, and wherein the network configuration manager requests the network setting information at the end of the polling cycle.

Consequently, the host can accurately receive requests transmitted through the wireless LAN from a plurality of clients in which the setting of the network was completed. Simultaneously, the host can accurately receive the setting information request through the wireless LAN.

Presentation application software (a program displays and controls presentation) is also stored in this network interface card. As a result, in the conference using the LAN, for example, when those who attend the conference bring their information terminal devices in which the presentation application software is not already installed, if this network interface card is attached to such information terminal device, then the information terminal device becomes able to execute the presentation application software and to display the presentation data.

When the information terminal device is one which automatically activates the application software stored in the hard disk (e.g., a personal computer in which the operating system automatically activates the application software stored in the hard disk), the network interface card allows the information terminal device to recognize the network interface card as the hard disk so that the presentation application software may be automatically activated in the information terminal device.

Consequently, those who attend the conference do not need to activate the presentation application software further reducing the inconvenience on those who attend the conference.

In order to solve the above second problem, there is proposed a network conference terminal device in which a network interface card is attached to an information terminal device such as a personal computer, for example, and which includes a presentation processor for displaying and controlling presentation data. This network interface card includes a connector for connecting this information terminal device to the wireless LAN and a network configuration manager for requesting that a host of this wireless LAN transmits setting information necessary for setting the network configuration settings to connect the information terminal device to the wireless LAN based on the fact that the network interface card is attached to this information terminal device and setting the network by using the setting information transmitted from the host.

This network conference terminal device is constructed by using the network interface card for the wireless LAN of the above network interface card. Accordingly, if the network interface card is pre-configured in the conference hall and the information terminal devices are brought by those who attend the conference, then a network conference using the wireless LAN can be set without troubling those who attend the conference. At the same time, the cost of equipment of the conference hall can be reduced, unlike the case in which the information terminal device is provided at each seat as fixed equipment.

This network conference terminal device includes a presentation processor for displaying and controlling presentation data. This network conference terminal device can display presentation data by this presentation processor.

Also in this network conference terminal device, this network interface card further includes a determining means for determining based on the fact that this network interface card is attached to the information terminal device whether the information terminal device is served as a host or a client of the LAN and a processing means for transmitting requested setting information to the client if it is determined by this determining means that the information terminal device is served as the host. The network configuration manager requests the setting information if it is determined by this determining means that the information terminal device is served as the client.

Consequently, the host of the LAN also is comprised of the network conference terminal device. Accordingly, the wireless LAN conference system can be constructed without providing an exclusive-device as a host independently of this network conference terminal device. Therefore, the cost of equipment in the conference hall can be suppressed more.

As mentioned before, this determining means determines the first information terminal device to which the network interface card is attached within the area of the wireless LAN as the host.

This network conference terminal device further includes a processing means for requesting the host to get a presentation right based on the fact that the information terminal device is determined as the client by the determining means, the setting of the network is completed by the network configuration manager and that a predetermined operation is carried out by the information terminal device and transmitting presentation data to the host and other clients based on the fact that the host got the presentation right and a processing means for allowing the client to get the presentation right based on the fact that the information terminal device is determined as the host by the determining means and that the processing means requests the host to get the presentation right.

Consequently, in the conference using the LAN, for example, those who attend the conference can get a presentation right by operating the information terminal devices and can transmit presentation data. Therefore, those who attend the conference can make a presentation without leaving their seats.

Also in this network conference terminal device, the network interface card further includes a processor for receiving, in a polling system, a request from the client in which the setting of the network was completed based on the fact that the information terminal device is determined as the host, and wherein the network configuration manager requests the setting information at the end of the polling cycle.

Consequently, the host can accurately receive requests transmitted through the wireless LAN from a-plurality of clients in which the setting of the network was completed. Simultaneously, the host can accurately receive the setting information request through the wireless LAN.

In this network conference terminal, the presentation processor can be realized when the information terminal device executes the presentation application software stored in the network interface card. Consequently, the information terminal device in which the presentation application software is not already installed becomes able to display the presentation data.

When the information terminal device is one which automatically activates the application software stored in the hard disk, the network interface card allows the information terminal device to recognize the network interface card as the hard disk so that the presentation application software may automatically be activated in the information terminal device.

Consequently, those who attend the conference need not carry out the operations to activate this presentation application further reducing the inconvenience on those who attend the conference.

In order to solve the above second problem, there is also proposed a network conference system (wireless LAN conference system) in which there are provided a host server of a wireless LAN and a client of the wireless LAN, the client is constructed such that a network interface card is attached to an information terminal device and includes a presentation processor for displaying and controlling presentation data. This network interface card includes a connector for connecting this information terminal device to the wireless LAN and a network configuration manager for requesting that a host of this wireless LAN transmits setting information necessary for setting the network to connect this information terminal device to this wireless LAN based on the fact that the network interface card is attached to this information terminal device and setting the network by using the setting information transmitted from the host. The host transmits the setting information to the client based on this setting information request and also transmits the presentation data to the clients for which the setting of the network configuration settings were completed.

This network conference system is constructed by using the above network conference terminal device as the client (i.e., the above wireless LAN network interface card).

Therefore, a network of the clients can be established without inconveniencing those who attend the conference, and the system can be constructed without increasing the cost of equipment of the conference hall.

Also in this network conference system, the network interface card further includes a processor for determining whether the information terminal device is a host or a client of the LAN and a for transmitting requested setting information to the client if it is that the information terminal device is the host. The network configuration manager requests the setting information if it is determined that the information terminal device is the client.

Consequently, since the host of the LAN also is part of the same network conference terminal device, an exclusive-device does not need to be provided within the system as the host, and hence the cost of equipment in the conference hall can be further reduced.

As mentioned previously, the processor determines and configures the first information terminal device that attaches to the network within the area of the wireless LAN as the host.

Also in this network conference system, this network interface card further includes a processor for requesting from the host a presentation right based on the fact that the information terminal device is determined as the client and that a predetermined operation is carried out by the information terminal device and transmitting presentation data to the host and other clients based on the fact that the host gave the presentation right to the client. Also, the grants the presentation right to the information terminal device based on the fact that the information terminal device is determined as the host of the LAN, and that the processor requests the host to get the presentation right.

Consequently, those who attend the conference can get the presentation right by operating the network conference terminal devices and can transmit presentation data.

Therefore, those who attended the conference can make a presentation without leaving their seats.

Also in this network conference system, this network interface card further includes a processor for receiving, in a polling system, a request from the client in which the setting of the network was completed based on the fact that the information terminal device is determined as the host, and wherein the network configuration manager requests the setting information at the end of the polling cycle.

Consequently, the host can accurately receive the requests transmitted through the wireless LAN from a plurality of clients in which the setting of the network was completed. Simultaneously, the host can accurately receive the setting information request through the wireless LAN.

Also in this network conference system, the presentation processor is realized when the information terminal device executes the presentation application software stored in the network interface card.

Consequently, the client and the host using the information terminal device in which the presentation application software is not already installed are able to display the presentation data.

When the information terminal device is one which automatically activates the application software stored in the hard disk, the network interface card allows the information terminal device to recognize the network interface card as the hard disk so that the presentation application software may be automatically activated in the information terminal device.

Consequently, those who attend the conference do not need to carry out the operations to activate this presentation application software further reducing the inconvenience on those who attend the conference.

In order to solve the above second problem, there is proposed a network conference system in which there are provided an image display device and a client of the wireless LAN. This image display device includes an information terminal device to which a network interface card can be attached. This network interface card is attached to this information terminal device and this information terminal device includes a presentation processor for displaying and controlling presentation data. The client is constructed such that a network interface card is attached to an information terminal device and includes this presentation processor. This network interface card includes a connector for connecting this information terminal device to the wireless LAN, a processor for determining based on the fact that the network interface card is attached to this information terminal device whether this information terminal device is a host or a client of the wireless LAN, a network configuration manager for requesting the host of this wireless LAN to transmit setting information necessary for setting the network settings to connect this information terminal device to this wireless LAN based on the fact that the information terminal device is determined as the client, and setting the network by using the setting information transmitted from the host, a processor for transmitting the requested setting information to the client based if the information terminal device is determined as the host, and transmitting presentation data to the client in which the setting of the network was completed, a processor for requesting the host to get a presentation right based on the fact that the information terminal device is determined as the client and a predetermined operation was executed by the information terminal device, and transmitting presentation data to the host and the client based on the fact that the host got the presentation right and a processor for allowing the client to get the presentation right based on the fact that the information terminal device is determined as the host and that the host is requested to get the presentation right. The image display device is one in which the information terminal device corresponding to the image display device is determined as the host by the determining means.

This network conference system has the arrangement in which the above network conference terminal device is used as the client (i.e., the above wireless LAN network interface card is used), the image display device having the information terminal device to which the network interface card can be attached is provided as the image display device such as the projector and this image display device serves both as an image display device and a host.

Accordingly, the network of the clients can be established without bothering those who attend the conference, and the system can be constructed without increasing the cost of equipment of the conference hall. Moreover, those who attend the conference can make a presentation without leaving their seats.

Then, the same presentation data as the presentation data displayed on the image display device can be directly transmitted from the image display device through the wireless LAN to the client and thereby displayed on the client. At the same time, the presentation data can be directly transmitted from the client through the wireless LAN to the image display device and thereby the presentation data can be displayed on the image display device.

Also in this network conference system, the network interface card further includes a processor for receiving, in a polling system, a request from the client in which the setting of the network was completed based on the fact that the information terminal device is determined as the host and awaiting the request of the setting information at the end of the polling cycle and wherein the network configuration manager requests the setting information at the end of the polling cycle.

Consequently, the host can accurately receive requests transmitted through the wireless LAN from a plurality of clients in which the setting of the network was completed. Simultaneously, the host can accurately receive the request of the network setting information through the wireless LAN.

Also in this network conference system, the presentation processor can be realized when the information terminal device executes the presentation application software stored in the network interface card.

Consequently, the client and the host using the information terminal device in which the presentation application software is not installed become able to display the presentation data.

When the information terminal device is one which automatically activates the application software stored in the hard disk, the network interface card allows the information terminal device to recognize the network interface card as the hard disk so that the presentation application software may automatically be activated in the information terminal device.

Consequently, those who attend the conference need not carry out the operations to activate this presentation application software further reducing the inconvenience on those who attend the conference.

DETAILED DESCRIPTION OF THE INVENTION

Figure 1:
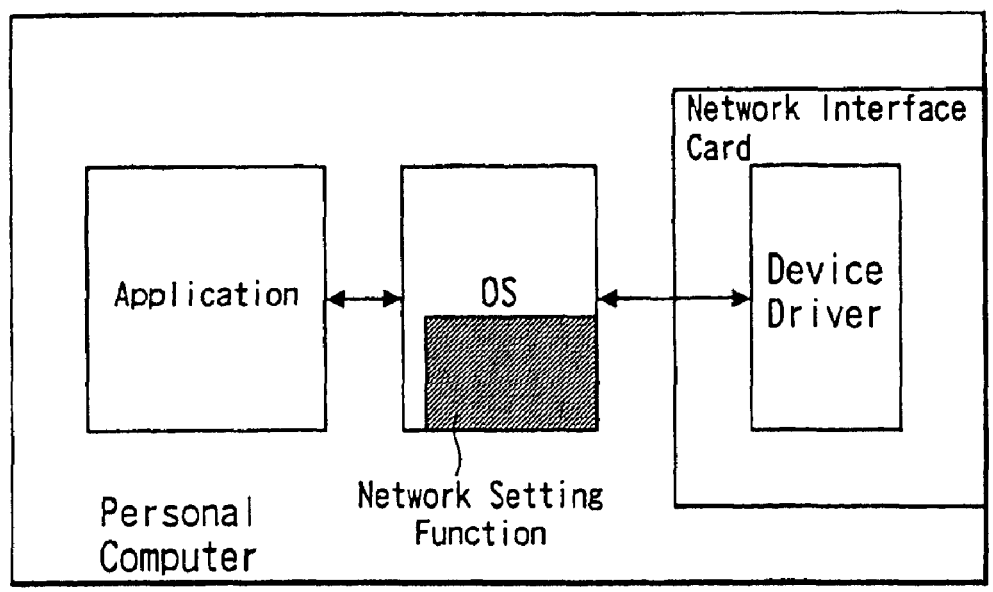
FIG. 1 is a functional block diagram showing a portion of a personal computer having a conventional network interface card and which has and operating system portion that is used to execute a network setting.

Embodiments according to the present invention will be described below with reference to the drawings.

Figure 3:
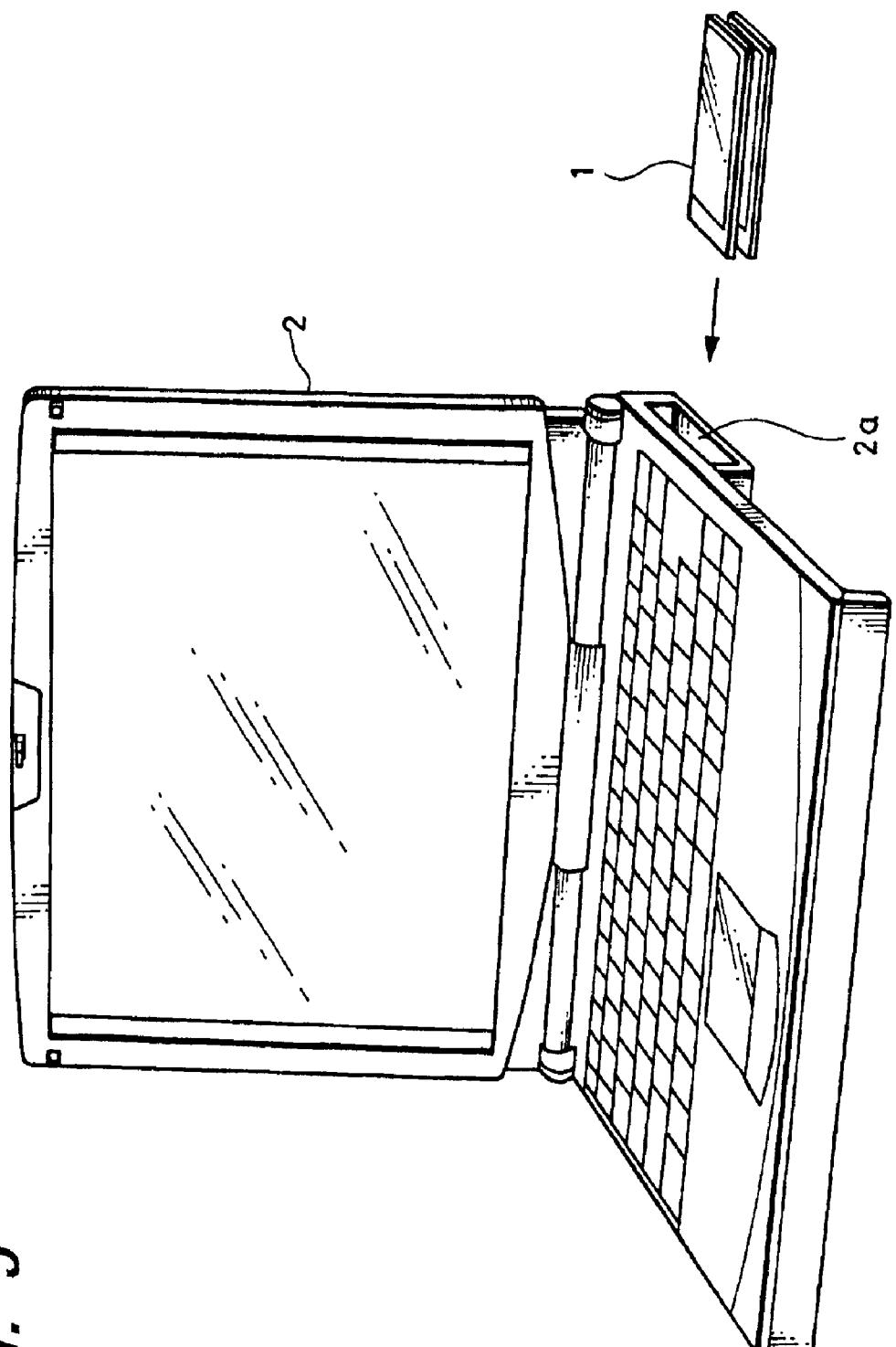
FIG. 3 is a perspective view showing an example of an outward appearance of a network interface card to which the present invention is applied.

The following reference numerals in the drawings refer to:

1 . . . network interface card
2 . . . notebook size personal computer
2a . . . PC card slot
3 . . . PCMCIA slot
4 . . . network interface
5 . . . RF modulator
6 . . . RF demodulator
7 . . . antenna
8 . . . CPU
9 . . . flash ROM
10 . . . RAM
11 (1) . . . wireless LAN conference terminal device (host)
11 (2) to 11 (n) . . . wireless LAN conference terminal devices (clients)
12, 14, 16 . . . projectors
13 . . . video camera
15 . . . personal computer FIG. 3 shows an example of an outward appearance and an arrangement of a network interface card, to which the present invention is applied, together with a notebook size personal computer to which this network interface card can be attached. This network interface card 1 has a shape and a dimension based on a type 2 or a type 3 of the PCMCIA. A notebook size personal computer 2 includes a personal computer card slot 2a into which the network interface card 1 can be inserted.

Figure 4:
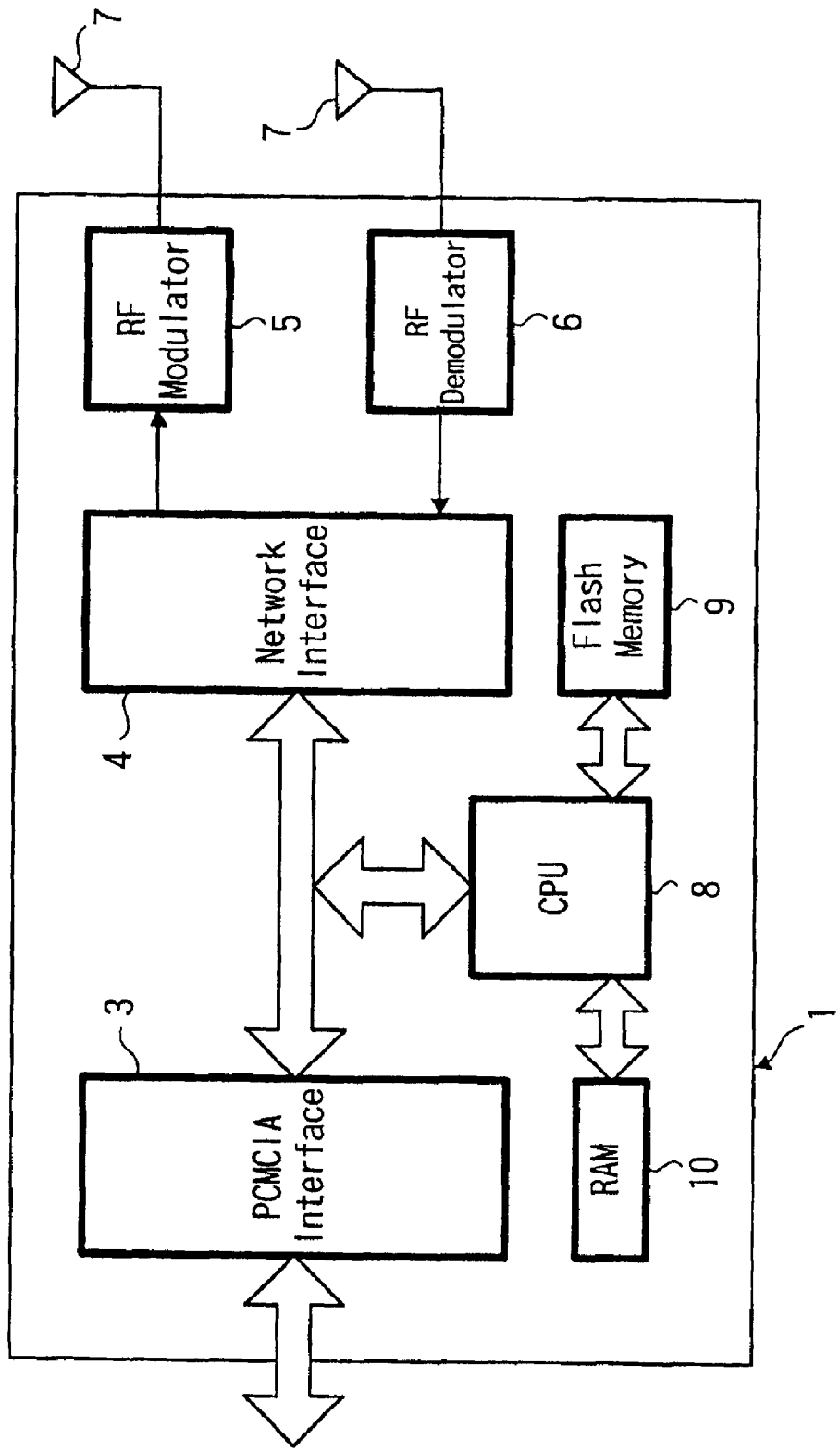
FIG. 4 is a block diagram showing an example of a circuit arrangement of the network interface card shown in FIG. 3.

FIG. 4 shows an example of a circuit arrangement of this network interface card 1. The network interface card 1 includes a PCMCIA interface 3, a network interface 4, an RF modulator 5, an RF demodulator 6, an antenna 7, a CPU 8, a flash ROM 9 and a RAM 10.

The PCMCIA interface 3 is an interface section which interacts with a personal computer having a PC card slot, like the notebook size personal computer 2 shown in FIG. 3. Through this PCMCIA interface 3, data and commands are transmitted and received between the personal computer having the network interface card 1 and the network interface card 1.

The network interface 4 transforms data and commands, transmitted thereto from the personal computer through the PCMCIA interface 3, into data and commands conforming to the format of predetermined wireless LAN standards (e.g., the standards of the 802.11 working of the IEEE), transmits the data and commands thus transformed into the RF modulator 5, and inverse-transforms data and commands, transmitted from the RF demodulator 6, and transmits the data and commands thus inverse-transformed to the PCMCIA interface 3.

The RF modulator 5 modulates data and commands, transmitted from the network interface 4, into a radio frequency signal based on the standards and transmits the radio frequency signal from the antenna 7. The RF demodulator 6 demodulates the radio frequency signal received at the antenna 7 to provide data and commands, and transmits the data and the commands to the network interface 4. While FIG. 3 shows the arrangement of the outward appearance in which the antenna 7 is an internal antenna, the present invention is not limited thereto and an antenna having a shape exposed to the outside may be used in response to a frequency band and the like.

The CPU 8 controls the PCMCIA interface 3 by executing a microprogram (firmware) stored in the flash ROM 9 so that data and command signals may be transmitted and received between the network interface card and the personal computer having the network interface card 1, and also controls the network interface 4 so that data and commands may be transmitted and received through the wireless LAN in accordance with a predetermined communications protocol (e.g., TCP/IP protocol).

As the features of the present invention, the flash ROM 9 stores therein the following microprograms (1) to (4). Contents processed by the programs, (1) to (3) will be described in the examples of operations of a host and a client of a network conference system as will be described later on. (1): A program which has processing instructions for enabling the personal computer having the network interface card 1 to function as a host for managing the wireless LAN (hereinafter referred to as a "host program"). (2): A program which has processing instructions for enabling the personal computer having the network interface card 1 to function as a client using the wireless LAN under management of the host (hereinafter referred to as a "client program"). (3): A program which has processing instructions for deciding whether the host program or the client program should be executed (hereinafter referred to as a "host/client decision program). (4): Presentation application software (program which has processing instructions for displaying and controlling presentation data such as images and other graphical data. This application software contains a graphic viewer program which is software for displaying images, software for creating, displaying and controlling graphical data (e.g., "Microsoft PowerPoint" manufactured by Microsoft, "Microsoft" and "PowerPoint" are registered trademarks of Microsoft) and a WWW browser which is software used to access WWW server on the Internet to display images of Web pages and the like.

The RAM 10 stores therein various processing data during which the CPU 8 executes microprograms within the flash ROM 9.

Figure 5:
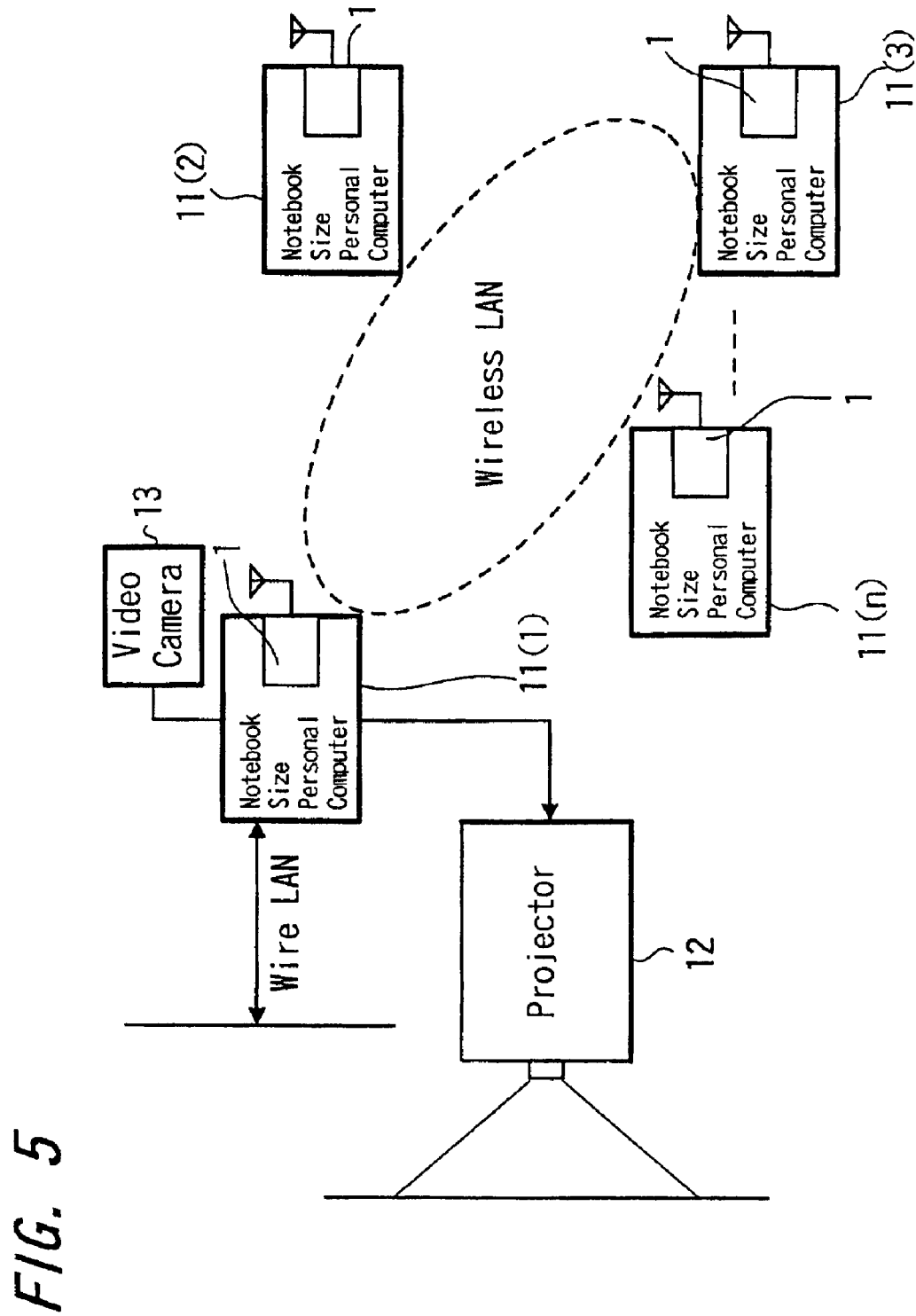
FIG. 5 is a diagram showing an example of an overall arrangement of a network conference system according to the present invention.

Next, FIG. 5 shows an example of an arrangement of a network conference terminal device (wireless LAN conference terminal device) according to the present invention and an example of an overall arrangement of a network conference system (wireless LAN conference system) according to the present invention.

This wireless LAN conference system is comprised of a plurality of (e.g., about 30 to 50) wireless LAN conference terminal devices 11 (11 (1) to 11 (n)), a projector 12 and a video camera 13.

Each wireless LAN conference terminal device 11 is constructed in such a manner that the network interface card 1 shown in FIGS. 3 and 4 is attached to a notebook size personal computer (Windows 95 or Windows 98, for example, is installed as the operating system) like the notebook size personal computer 2 shown in FIG. 3. Participants bring the notebook size personal computer with them and the network interface cards 1 are available in the conference hall.

One (11 (1)) of the wireless LAN conference terminal devices 11 is served as a host of the wireless LAN, and remaining (n−1) terminal devices (11 (2) to 11 (n)) are served as clients of the wireless LAN.

The wireless LAN conference terminal device 11 is determined when the network interface card 1 starts the "host/client decision program" stored in the aforementioned flash ROM 9 based on the fact that the operating system of the notebook size personal computer is activated after the network interface card 1 has been attached to the notebook size personal computer (or based on the fact that the network interface card 1 has been attached to the notebook size personal computer whose operating system was activated).

Figure 6:
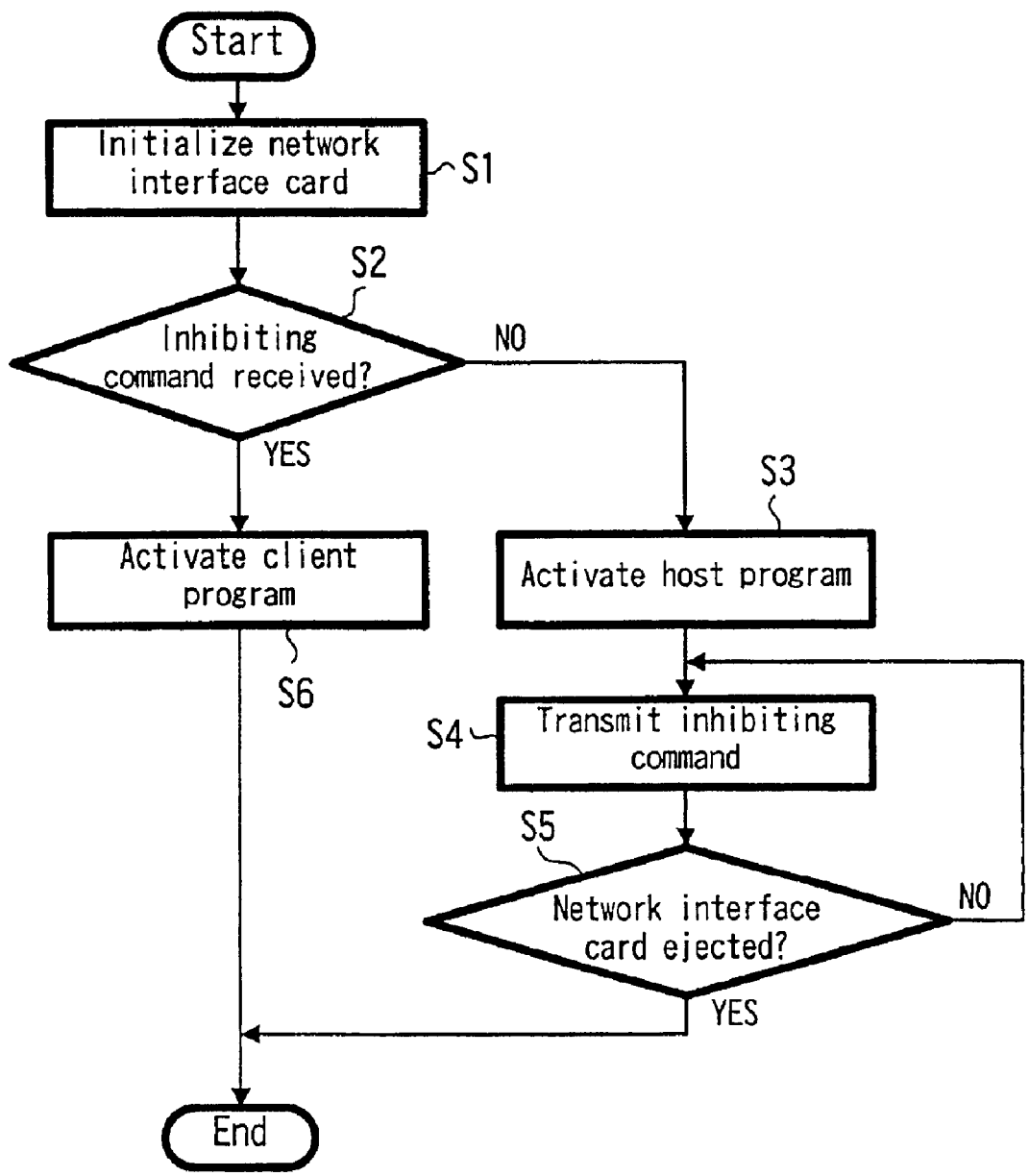
FIG. 6 is a flowchart to which reference will be made in explaining the processing of a "host/client decision program".

FIG. 6 shows the processed contents of this "host/client decision program". First, the network interface card 1 is initialized (data stored when this network interface card was attached to and used by the notebook size personal computer is erased (step S1). Subsequently, it is determined whether or not a command for inhibiting the activation of the "host program" is received through the wireless LAN (step S2).

If this command is not received, then the "host program" is activated (step S3). Then, until the network interface card 1 is ejected from the notebook size personal computer or the operating system of the notebook size personal computer is ended, the command for inhibiting the activation of the "host program" is continuously transmitted through the wireless LAN (steps S4, S5). Then, when the network interface card 1 is ejected from the notebook size personal computer or the operating system is ended, control is ended.

If on the other hand the above inhibiting command is received at the step S2, then the "client program" is activated (step S6), and control is ended.

As a consequence, the wireless LAN conference terminal device 11 which was the first terminal device to which the network interface card 1 was attached and in which the operating system of the notebook size personal computer was activated within the conference hall (within the wireless LAN area) is served as the host after the "host program" was activated by executing the steps S2 to S4.

Since the wireless LAN conference terminal device 11 which was the second terminal device to which the network interface card 1 was attached and in which the operating system of the notebook size personal computer was activated receives the command transmitted from the first wireless LAN conference terminal device 11 to which the network interface card 1 was attached and in which the operating system of the notebook size personal computer was activated, this terminal device is served as the client after the "client program" was activated by executing the steps S1, S2 and S5.

In actual practice, a participant who plays a part of a coordinator in the conference first attaches the network interface card 1 to the notebook size personal computer or the participant first activates the operating system of the notebook size personal computer to make its own wireless LAN conference terminal device 11 become the host.

As shown in FIG. 5, the host 11 (1) is connected through an external display output terminal of the notebook size personal computer to the projector 12 located within the conference hall and is also connected through a DV terminal of the notebook size personal computer to the video camera 13.

The host 11 (1) is connected through a network port of the notebook size personal computer to a wire LAN (e.g., Ethernet) which was constructed in advance within a building in the conference hall. This wire LAN is connected to the Internet through a gateway, not shown.

The "client program" contains processing steps used to execute the network setting to connect the clients 11 (2) to 11 (n) to the wireless LAN. The network interface cards 1 of the clients 11 (2) to 11 (n) whose "client programs" were activated immediately start this network setting processing.

The "host program" contains processing steps to transmit setting information necessary for the network setting to the clients 11 (2) to 11 (n) in response to the network setting processing of this "client program". The host 11 (1) immediately starts the processing of the "host program".

Figure 7:
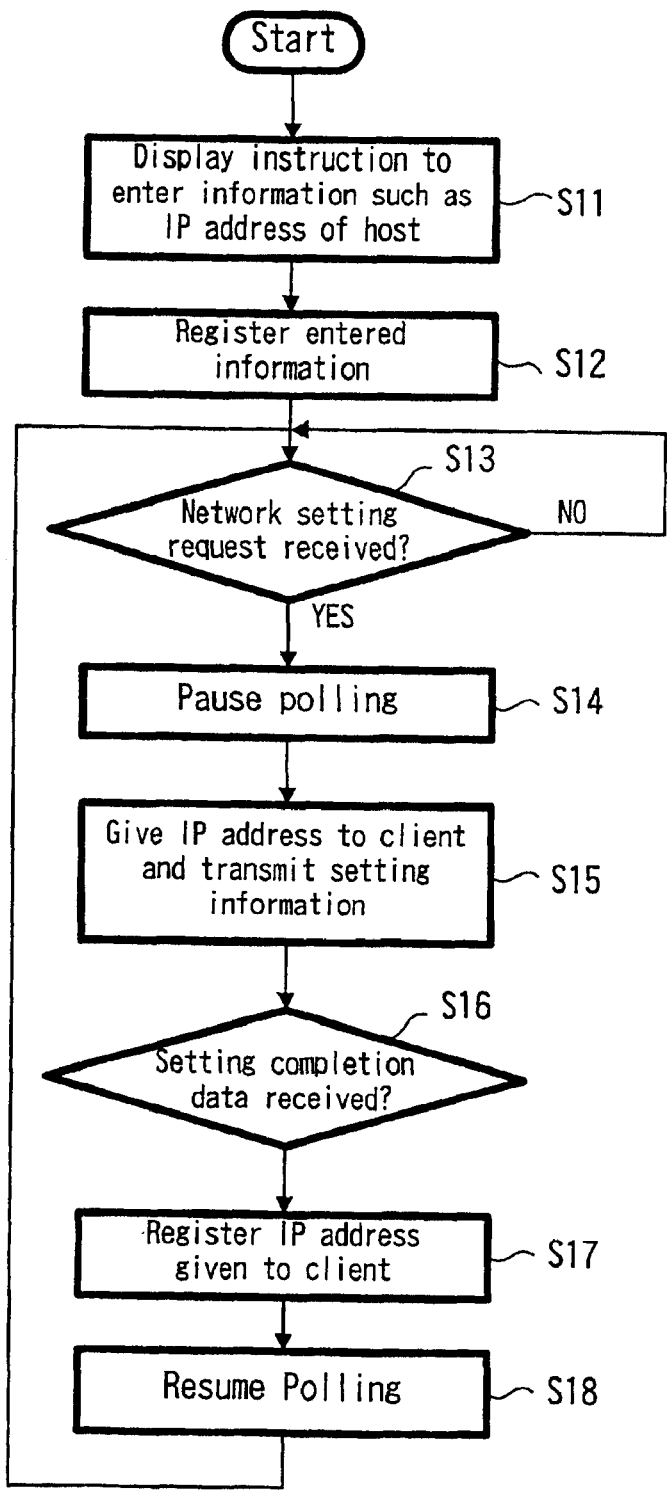
FIG. 7 is a flowchart to which reference will be made in explaining the processing of a "host program" corresponding to a network setting processing of a "client program".
Figure 8:
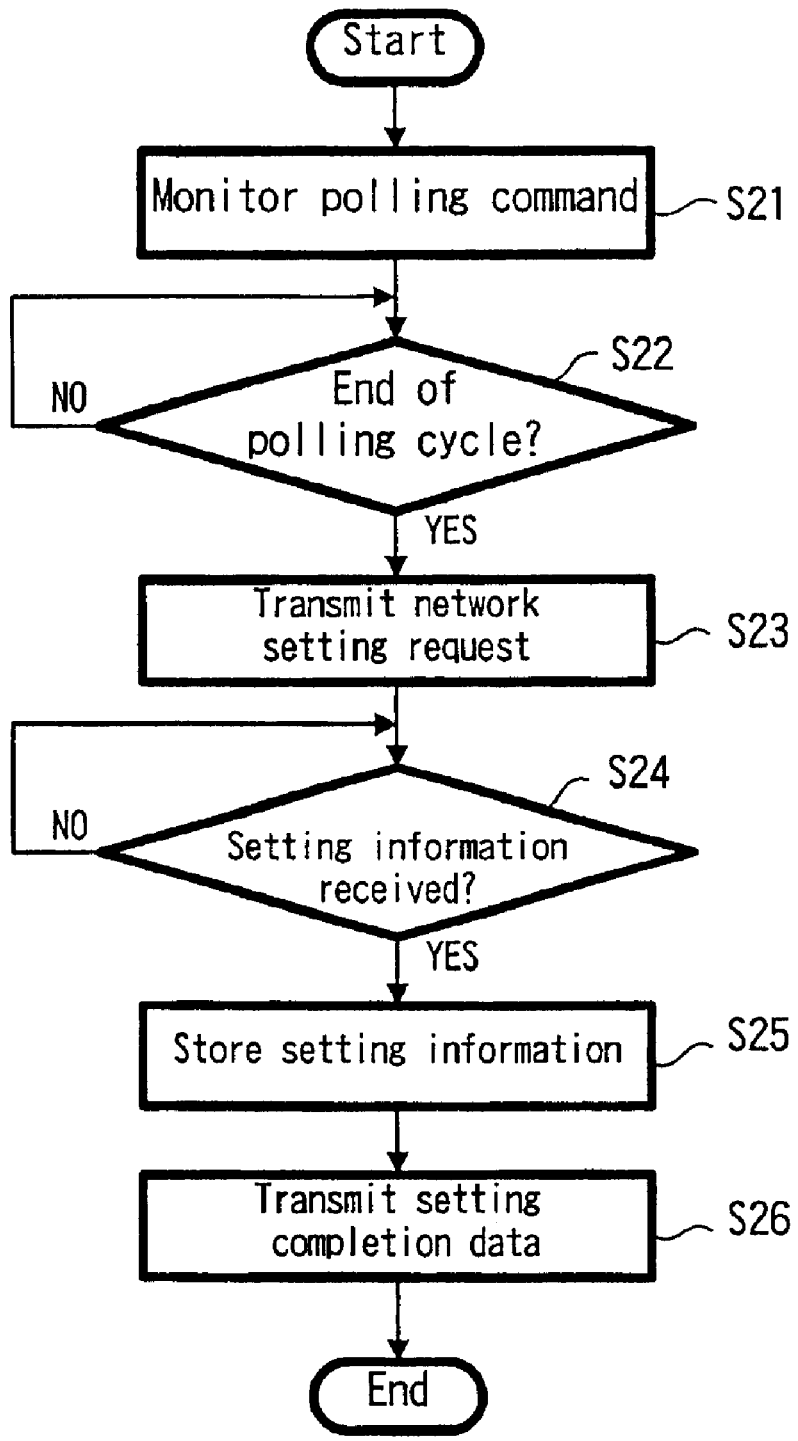
FIG. 8 is a flowchart to which reference will be made in explaining a network setting processing which is a part of the processing of the "client program".

FIG. 7 shows processing steps of the "host program" corresponding to the network setting processing. FIG. 8 shows the steps of the network setting processing. As shown in FIG. 7, the network interface card 1 of the host 11 (1) displays pictures which instruct the notebook size personal computer to enter the following information (a) to (d):

(a): Enter net mask (information for dividing the IP address into a previously-determined network portion and a host portion which can be set freely);

(b): Enter IP address of host;

(c): Enter IP address of DNS server (server for providing a translation between IP addresses and domain names); and (d): Enter IP address of gateway (a means placed at the connected portion between the wire LAN and the Internet in FIG. 3)

Then, when the coordinator of the conference enters these information by operating the notebook size personal computer in accordance with the instructions displayed on the screen, these information are registered on the RAM 10 as the database (step S12). Subsequently, the host is placed in the standby mode for awaiting the network setting request from the client (step S13).

The "host program" contains a processing for receiving various kinds of requests from the network interface card 1 of the client in which the network setting was already completed (client whose IP address was already registered as the database) in the polling system for sequentially calling these clients. Moreover, the "client program" contains processing steps for transmitting a request, generated after the network setting has been completed, in response to this calling.

Figure 9:
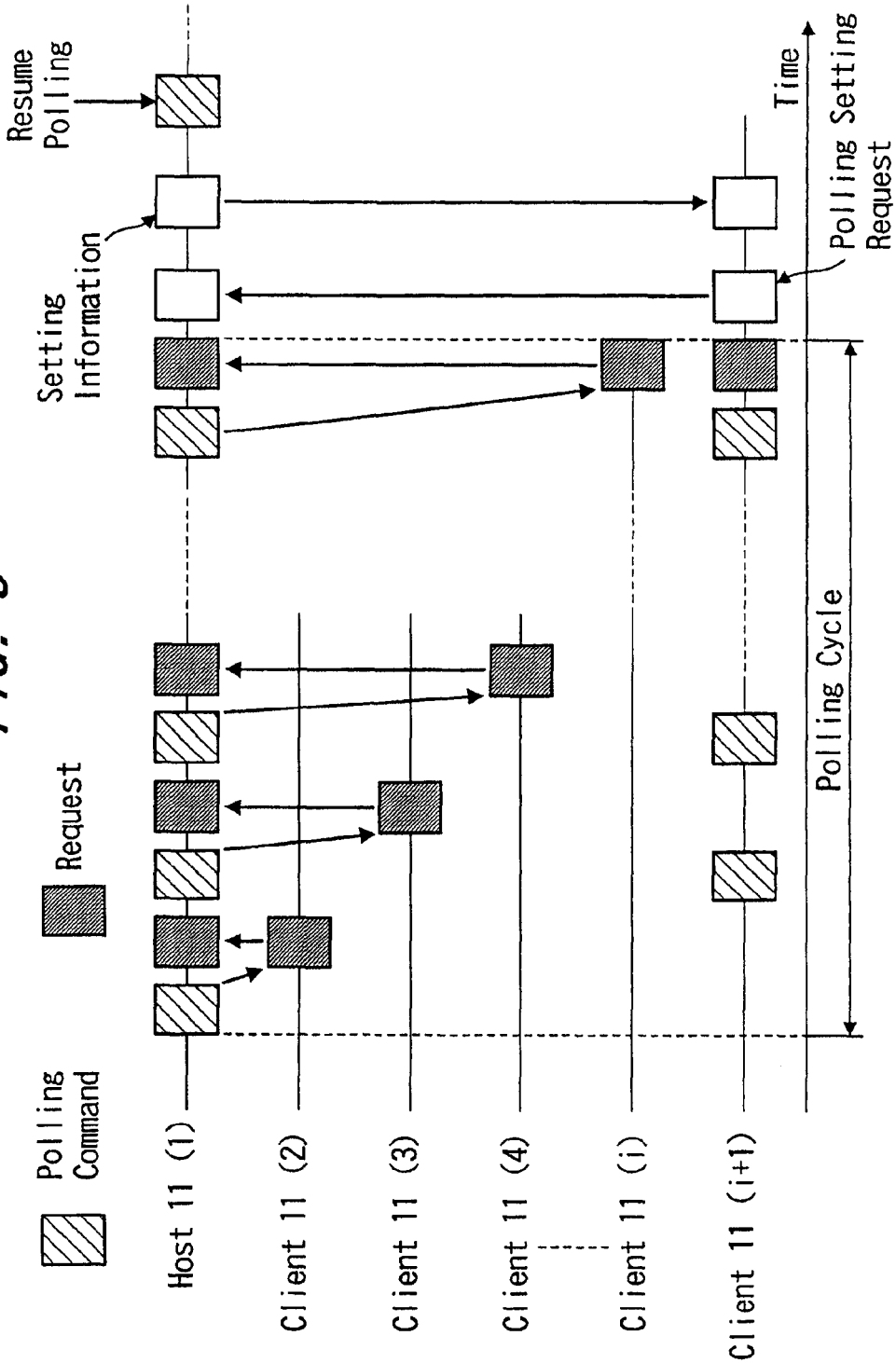
FIG. 9 is a timing chart showing the manner in which a request signal is transmitted or received in accordance with a polling system.

FIG. 9 shows the manner in which the requests are transmitted and received in accordance with this polling system. The network interface card 1 of the host 11 (1) transmits a polling command for permitting the transmission of the request to one client 11 (2) of the clients 11 (2) to 11 (i) in which the network setting was already completed. Then, this network interface card awaits the request during a constant time t.

The network interface card 1 of the client 11 (2) learns that it is permitted to transmit the request, and transmits the request within a time t1 if it has any request. On the other hand, the network interface cards 1 of the clients 11 (3) to 11 (i) are not permitted to transmit the requests, and hence they do not transmit the requests. Accordingly, within this time t1, only the request from the client 11 (2) is received by the host 11 (1).

Subsequently, the network interface card 1 of the host 11 (1) transmits the polling command for permitting the transmission of the request to the next client 11 (3) and awaits the request during the time t1. Within this time t1, only the request from the client 11 (3) is received by the host.

In a similar manner, the host sequentially transmits the polling commands to the clients 11 (4) to 11 (i) one by one and awaits their requests during the time t1. As a result, since the requests are transmitted one by one from the clients 11 (2) to 11 (i) and received by the host 11 (1), the host can accurately receive the requests from those clients without being affected by an interference caused when the requests from a plurality of clients are received through the wireless LAN at the same time.

Data "Polling end" indicating that one cycle of calling the clients in which the network setting was completed was finished (indicating the end of the polling cycle) is added to the polling command which is to be transmitted to the last client 11 (i). Then, after the host has awaited the request from the client 11 (i) during the time t1, the host is further placed in the standby mode during a constant time t2. If the request is not received by the host during this time t2, then the host immediately calls the next client (i.e., the host sequentially transmits the polling commands again to the clients 11 (2) to 11 (i) one by one and awaits the request during the time t1).

Figures 10A, 10B, 11:
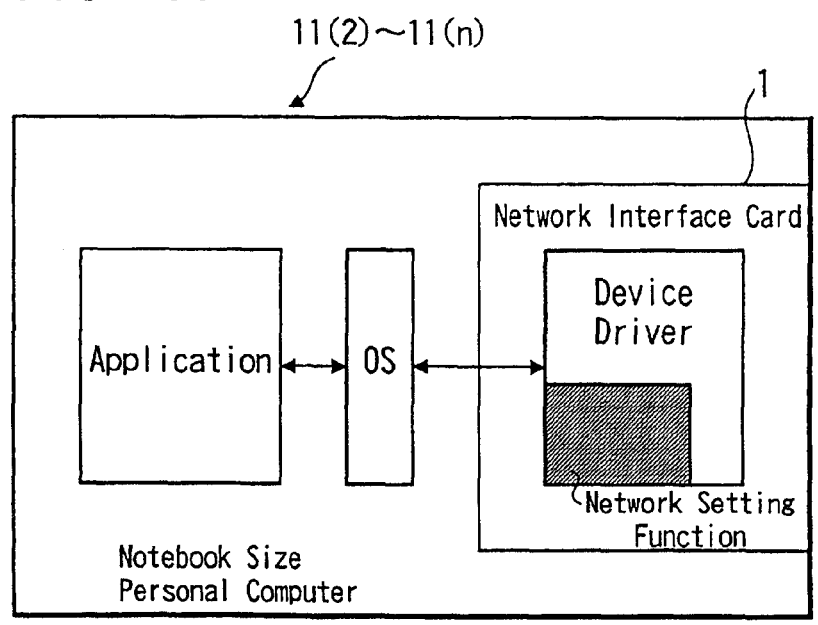
FIG. 10A is a diagram showing formats of the polling command and the request signal shown in FIG. 9.
FIG. 10B is a diagram showing examples of contents of data or command.
FIG. 11 is a functional block diagram showing a portion, of the client shown in FIG. 5, used to execute the network setting.

FIG. 10A shows formats of the polling command and the request signal. The polling command and the request signal contain an IP address of a transmission destination, an IP address of a transmission source, a value indicating bytes of the following signal, data or a command indicating the contents of the polling command and the request signal and a checksum, in that order.

FIG. 10B shows examples of the contents of the data or the command shown in FIG. 10A. The "Polling end" is data which is added to the polling command transmitted to the last client in order to indicate the end of the polling cycle.

A network interface card 1 of a client 11 (i+1) attached to the notebook size personal computer (of which the network setting was not yet executed) somewhere in this polling cycle continues monitoring this polling command until the polling command with the data "Polling end" attached thereto is received (i.e., up to the end of the polling cycle) as shown in FIG. 8 (steps S21, S22). Then, at the end of the polling cycle, after only the time t1 during which the client 11 (i) in FIG. 9 is allowed to transmit the request signal has elapsed, the network setting request signal is transmitted to the host 11 (1) during the time t2 (when the request signal transmitted from the client 11 (i) is received within this time t1, the request signal may be transmitted to the host before the time t1 elapses) (step S23).

This network setting request signal is transmitted in accordance with the signal format shown in FIG. 10A. However, since the IP address is not given to the client 11 (i+1) from the host 11 (1), the IP address of the transmission source is set to a dummy address which is determined by the network interface card 1 of the client 11 (i+1), for example. In this network setting request signal, as shown in FIG. 10B, the contents of the data or the command are set to "Request IP address".

The network interface card 1 of the host 13 (1) awaits this network setting request at every time t2 after the end of the polling cycle in FIG. 9 at the step S13 shown in FIG. 7. Consequently, the client can accurately receive the network setting request without being affected by the interference caused when the request from the client in which the network setting was already completed and this network setting request are received simultaneously.

Then, if the host receives the network setting request within this time t2, then the polling system request receiving processing shown in FIG. 9 is paused (step S14). Then, the IP address is given to the client 11 (i+1), and as shown in FIG. 9, that IP address and the IP addresses of the host registered at the step S12 and the DNS server are transmitted to the client 11 (i+1) as setting information for the network (step S15).

These IP addresses are transmitted in accordance with the signal format shown in FIG. 10A. The IP address of the transmission destination is set to a dummy address which is determined by the network interface card 1 of the aforementioned client 11 (i+1).

As shown in FIG. 8, the client 11 (i+1) which has transmitted the network setting request signal awaits the reception of these IP addresses (step S24). Then, if these IP addresses are received, then the setting used to connect the client 11 (i+1) to the wireless LAN is executed by storing these IP addresses in the RAM 10 (step S25). Then, data indicating that the network setting was completed is transmitted through the wireless LAN (step S26). Then, control is ended.

The data indicating that the network setting was completed also is transmitted in accordance with the signal format shown in FIG. 10A. Then, the IP address of the transmission source is set to the IP address given from the host 11 (1). In this data, as shown in FIG. 10B, the contents of the data or the command are set to a "Complete set IP Address".

As shown in FIG. 7, the network interface card 1 of the host 11 (1) awaits the reception of the data indicating that this network setting was completed (step S16). Then, when this data is received, the IP address given to the client 11 (i+1) is registered as a database (step S17).

Subsequently, the polling system request reception processing which was temporarily interrupted is resumed (step S18). In the resumed polling system request reception processing, the clients 11 (2) to 11 (i+1) including the client 11 (i+1) in which the network setting was completed are called sequentially.

Then, referring back to the step S13, the host awaits the fact that another client executes the network setting. The processing shown in FIG. 7 is executed until the network interface card 1 is ejected from the notebook size personal computer or the operating system of the notebook size personal computer is ended.

In the resumed polling system request reception processing, the clients 11 (2) to 11 (i+1) including the new client in which the network setting was completed are called sequentially.

In the stage in which the network setting of even one client is not yet completed, the network interface card 1 of the host 11 (1) does not receive the request signal in accordance with the polling system. Therefore, at that stage, while the network interface card 1 of the host 11 (1), for example, is constantly awaiting the network setting request from the client at the step S13 shown in FIG. 7, the network interface card 1 of the client transmits the network setting request at any time on condition that the host 11 (1) has not yet transmitted the polling command.

By the processing shown in FIGS. 7 and 8, the network setting for connecting the respective clients 11 (2) to 11 (n) of FIG. 5 to the wireless LAN is completed as an assumption that the participants are to attend the wireless LAN conference.

FIG. 11 shows a function of any portion of the clients 11 (2) to 11 (n) used to execute this network setting. The device driver (microprogram stored within the flash ROM 9 shown in FIG. 4) for controlling the network interface card 1 contains the network setting function (the "host program" and the "client program"). The network setting of the clients 11 (2) to 11 (n) is executed by using the device driver function of this network interface card 1.

Accordingly, as is clear from the contrast with FIG. 1 which shows the conventional network interface card, the network setting can be carried out without using the operating system of the notebook size personal computer to which the network interface card 1 is attached.

Figure 12:
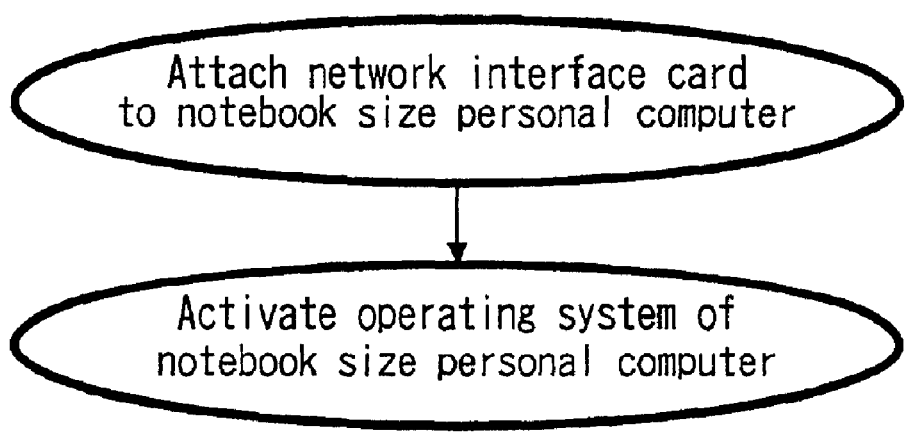
FIG. 12 is a diagram showing a working procedure which is used to execute the network setting of the client shown in FIG. 5.

FIG. 12 shows a procedure of operations that should be executed by the participants of the conference in order to execute the network setting of the clients 11 (2) to 11 (n). When the network interface card 1 is attached to the notebook size personal computer and the operating system of the notebook size personal computer is activated (the network interface card 1 may be attached to the notebook size personal computer after the operating system of the notebook size personal computer has been activated), the network setting is automatically executed by the processings shown in FIGS. 7 and 8.

Figure 2:
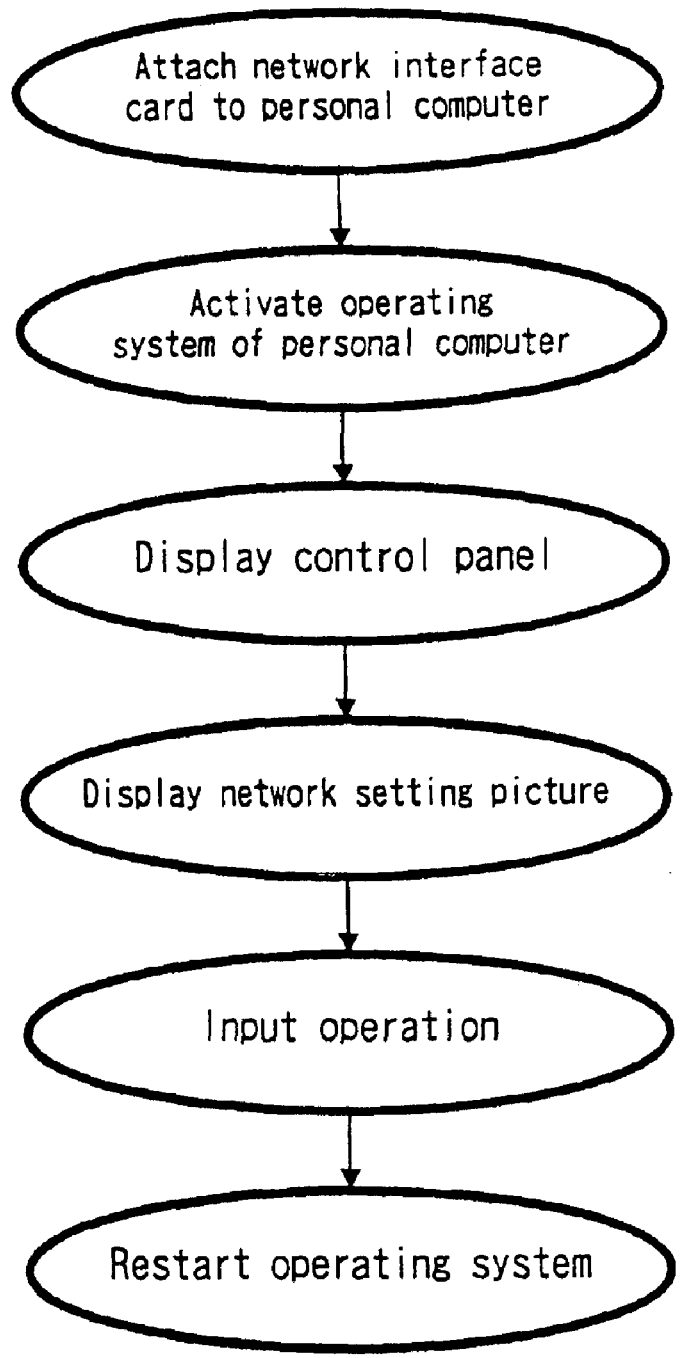
FIG. 2 is a diagram showing a working procedure necessary to execute a network setting of the personal computer shown in FIG. 1.

Accordingly, as is clear from the contrast with FIG. 2 which shows the conventional network interface card, the network setting of the clients 11 (2) to 11 (n) as the assumption that the participants are to attend the wireless LAN can be carried out without imposing a burden on the participants of the conference.

The "host program" and the "client program" respectively contain processing steps in which a presentation is executed by using presentation application software stored within the flash ROM 9. The network interface card 1 of the host 11 (1) which has activated the "host program" immediately starts this processing after the network setting of any one client has been completed. The network interface card 1 of the clients 11 (2) to 11 (n) which have activated the "client program" also starts this processing after the respective network settings have been completed.

Figure 13:
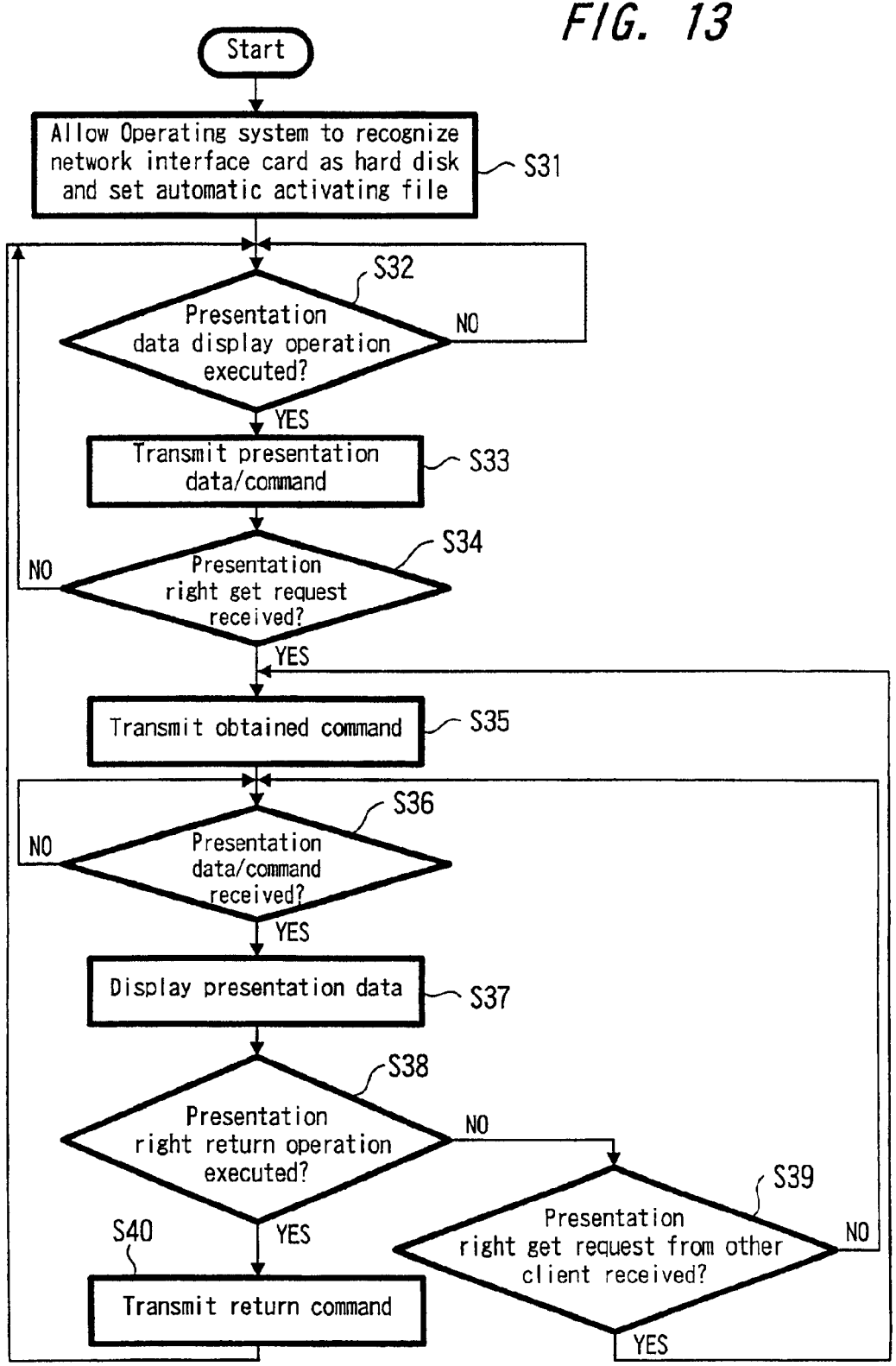
FIG. 13 is a flowchart to which reference will be made in explaining a part of the processing of the "host program".
Figure 14:
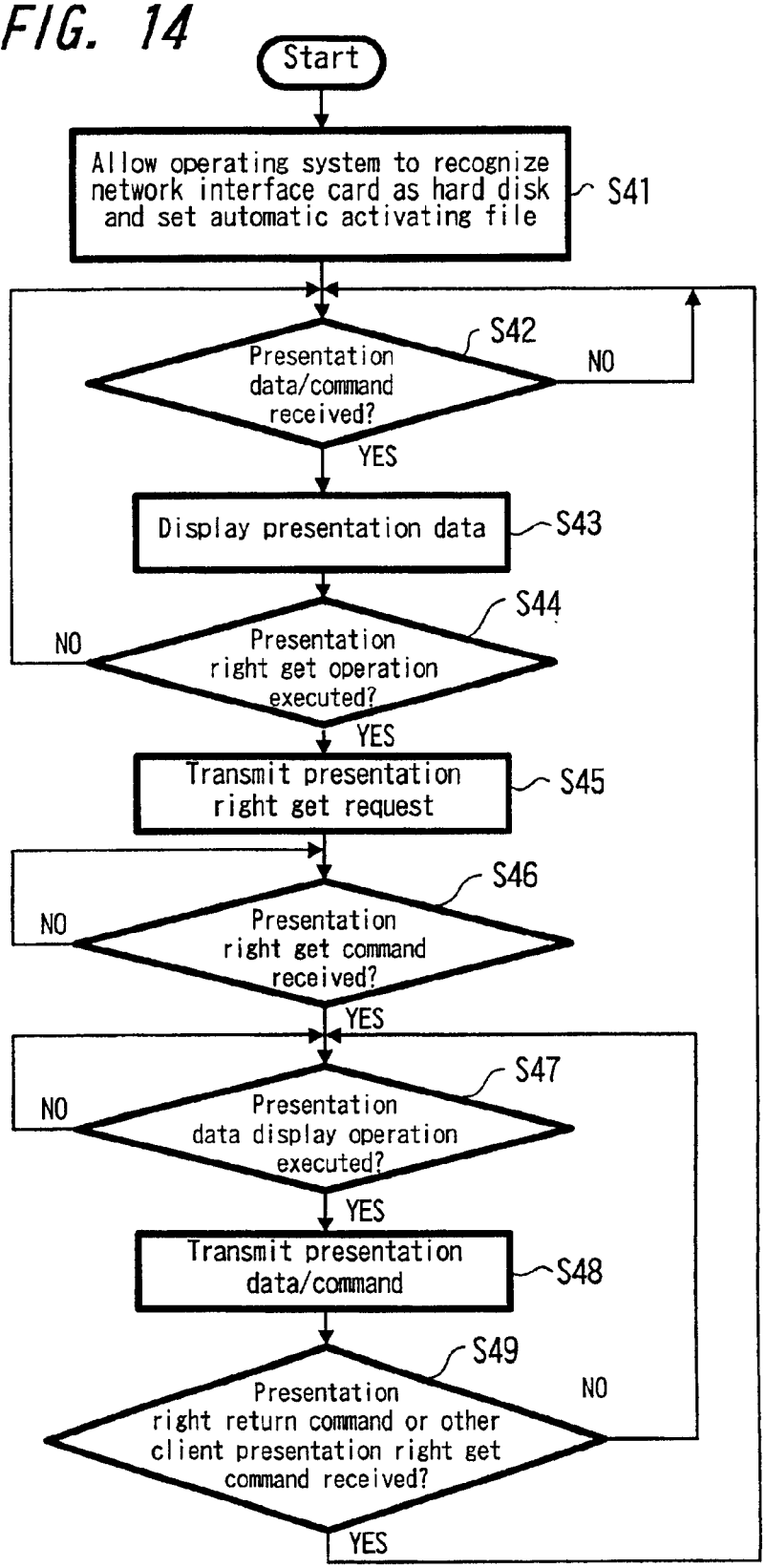
FIG. 14 is a flowchart to which reference will be made in explaining a part of the processing of the "client program".

FIGS. 13 and 14 show the contents of the processing steps of the "host program" and the "client program", respectively. As shown in FIG. 13, the network interface card 1 of the host 11 (1) enables the operating system of the notebook size personal computer of the host 11 (1) to recognize this network interface card 1 as a hard disk. At the same time, this network interface card sets an automatic activation file (step S31).

The Windows 95 and the Windows 98 operating systems have a function in which application software stored within the hard disk can automatically be activated when the automatic activating file is set to the hard disk. Accordingly, the notebook size personal computer of the host 11 (1) recognizes the network interface card 1 as the hard disk based on the processing at this step S31 so that the presentation application software stored within the flash ROM 9 is activated automatically.

The processing at this step S31 may be the existing processing which is adopted by a "MEMORY STICK", for example.

The coordinator of the conference can display the presentation data on the notebook size personal computer of the host 11 (1) by operating the notebook size personal computer of the host 11 (1) in accordance with the presentation application software which was activated automatically and can display the same presentation data on the projector 12 (FIG. 5) through the external display output terminal of the notebook size personal computer of the host 11 (1).

Specifically, by using "Microsoft PowerPoint", for example, illustrations and the like reproduced from the hard disk and the floppy disk of the notebook size personal computer of the host 11 (1) and illustrations and the like transmitted from the server of the wire LAN can be displayed on the notebook size personal computer of the host 11 (1) and the projector 12.

Images reproduced from the hard disk and the floppy disk of the notebook size personal computer of the host 11 (1) by using the graphic viewer, images transmitted from the server of the wire LAN and images picked up by the video camera 13 (FIG. 5) can be displayed on the notebook size personal computer of the host 11 (1) and the projector 12 shown in FIG. 5 by using the graphic viewer.

Moreover, images and the like of the web page can be displayed on the notebook size personal computer of the host 11 (1) and the projector 12 shown in FIG. 5 by accessing the WWW of the Internet through the wire LAN with the WWW browser.

As shown in FIG. 14, the network interface cards 1 of the clients 11 (2) to 11 (n) enable the notebook size personal computers of the clients 11 (2) to 11 (n) to recognize this network interface card 1 as a hard disk, respectively. At the same time, the above network interface cards set the automatic activating file (step S41).

Accordingly, the notebook size personal computers of the clients 11 (2) to 11 (n) recognize the network interface card 1 as the hard disk so that the presentation application software stored in the flash ROM 9 may be activated automatically.

Other participants of the conference than the coordinator can display presentation data on the notebook size personal computers of the clients 11 (2) to 11 (n) by operating the notebook size personal computers of the clients 11 (2) to 11 (n) with this presentation application software, respectively.

As shown in FIG. 13, the network interface card 1 of the host 11 (1) awaits the operation in which the presentation data is displayed on the notebook size personal computer of the host 11 (1) by using the presentation application software (step S32).

Then, when that operation is carried out (i.e., the presentation data is displayed on the notebook size personal computer of the host 11 (1) and the projector 12), the same presentation data is transmitted to the clients 11 (2) to 11 (n), and a command for displaying the presentation data by using the presentation application software (e.g., graphic viewer in case of images) corresponding to that presentation data and a command for displaying that presentation data in synchronism with the host 11 (1) (page switching timing and the like are made simultaneously) are transmitted to the clients 11 (2) to 11 (n).

As shown in FIG. 14, the network interface cards 1 of the clients 11 (2) to 11 (n) await the reception of this presentation data and the commands (step S42). Then, if the network interface cards receive the presentation data and the commands, then this presentation data is displayed on the notebook size personal computers of the clients 11 (2) to 11 (n) by using the presentation application software in accordance with this command, respectively (step S43).

Consequently, the same presentation data as that displayed on the projector 12 is also displayed on the notebook size personal computers of the clients 11 (2) to 11 (n).

As shown in FIG. 13, while executing the steps S32 and S33, the network interface card 1 of the host 11 (1) repeatedly determines whether or not a presentation right "get" request from any of the clients 11 (2) to 11 (n) is received (step S34). The request signals are transmitted and received in the polling system shown in FIG. 9 in the processings shown in FIGS. 13 and 14.

As shown in FIG. 14, while executing the steps S42 and S43, the network interface cards 1 of the clients 11 (2) to 11 (n) repeatedly determine whether or not the notebook size personal computers of the clients 11 (2) to 11 (n) execute the predetermined operation in order to get the presentation right (step S44). If this operation is executed, then the presentation right "get" request is transmitted to the host 11 (1) (step S45).

As shown in FIG. 13, if the presentation right "get" request from any of the clients 11 (2) to 11 (n) is received, then the network interface card 1 of the host 11 (1) transmits the presentation right "get" command to the corresponding client (step S35).

As shown in FIG. 14, after the network interface card 1 of the client which has transmitted the presentation right "get" request, this network interface card 1 waits for the presentation right "get" command to be received (step S46).

When this command is received, the network interface card waits for the notebook size personal computer of the client to display presentation data by using the presentation application software (step S47).

If such operation is carried out (i.e., if the presentation data is displayed on the notebook size personal computer of the client concerned), then the same presentation data is transmitted to the host 11 (1) and other clients, and the command for displaying the presentation data by using the presentation application software corresponding to that presentation data and the command for displaying that presentation data in synchronization with the client are transmitted to the host 11 (1) and other clients (step S48).

As shown in FIG. 13, it is determined by the network interface card 1 of the host 11 (1) whether the presentation data and the command are received (step S36). If they are received, then this presentation data is displayed on the notebook size personal computer of the host 11 (1) and the projector 12 by using the presentation application software (step S37). The network interface cards 1 of other clients display this presentation data at the steps S42, S43 shown in FIG. 14.

As a result, the same presentation data as that displayed on the notebook size personal computer of the client who obtained the presentation right is displayed on the notebook size personal computers of the host 11 (1) and other clients and the projector 12.

As shown in FIG. 13, while executing the steps S36 and S37, the network interface card 1 of the host 11 (1) repeatedly determines whether or not the notebook size personal computer of the host 11 (1) executes a predetermined operation for returning the presentation right (step S38) and also repeatedly determines whether or not a new presentation right "get" request from another client is received (step S39).

Then, if the presentation return operation is executed, then a command for returning the presentation right is transmitted to the client which obtained the presentation right (step S40). Then, control goes back to the step S32.

If the presentation right "get" request from any one of other clients is received, then at a step S35, a new presentation right "get" command is transmitted to that client.

As shown in FIG. 14, while executing the steps S47 and S48 and transmitting the presentation data and the command, it is repeatedly determined by the network interface card 1 of the client that obtained the presentation right whether or not the presentation right return command or the command for enabling another client to get the presentation right is received (step S49). Then, if any command is received, then control goes back to the step S42.

Consequently, the presentation right is again transferred to the host 11 (1) or other client and the presentation data transmitted from the host 11 (1) or the client is displayed on the notebook size personal computers of the host 11 (1) and the clients 11 (2) to 11 (n) and the projector 12.

The processings shown in FIGS. 13 and 14 are continuously executed until the network interface card 1 is ejected from the notebook size personal computer or the operating system of the notebook size personal computer is terminated.

By the processing steps shown in FIGS. 13 and 14, the same presentation data as that displayed on the projector 12 is displayed on the notebook size personal computers of the clients 11 (2) to 11 (n). Moreover, the presentation data transmitted from the client (the client which has obtained the presentation right) is displayed on the notebook size personal computers of other clients and the projector 12.

Therefore, a participant in a seat distant from the projector can visually confirm the presentation data by watching the screen of the notebook size personal computer of the client. The participant in a seat which is not distant from the projector 12 is able to watch the presentation data from either the projector 12 or the notebook size personal computer of the client (e.g., the participant can watch the image through the projector 12 having the large-size screen and can also watch small illustrations through the notebook size personal computer of the client).

Moreover, while being seated, the participant of the conference can obtain the presentation right by the client and can transmit the presentation data. Therefore, the participant can make a presentation without leaving his or her seat.

The "host program" and the "client program" contain processing steps that are used to individually display data from the server of the wire LAN (FIG. 5) and data from the WWW server of the Internet on the notebook size personal computers of the individual clients 11 (2) to 11 (n). The network interface cards 1 of the host 11 (1) and the clients 11 (2) to 11 (n) start these processing steps immediately after the presentation application software has automatically been activated in the presentation processings shown in FIGS. 13, 14.

Figure 15:
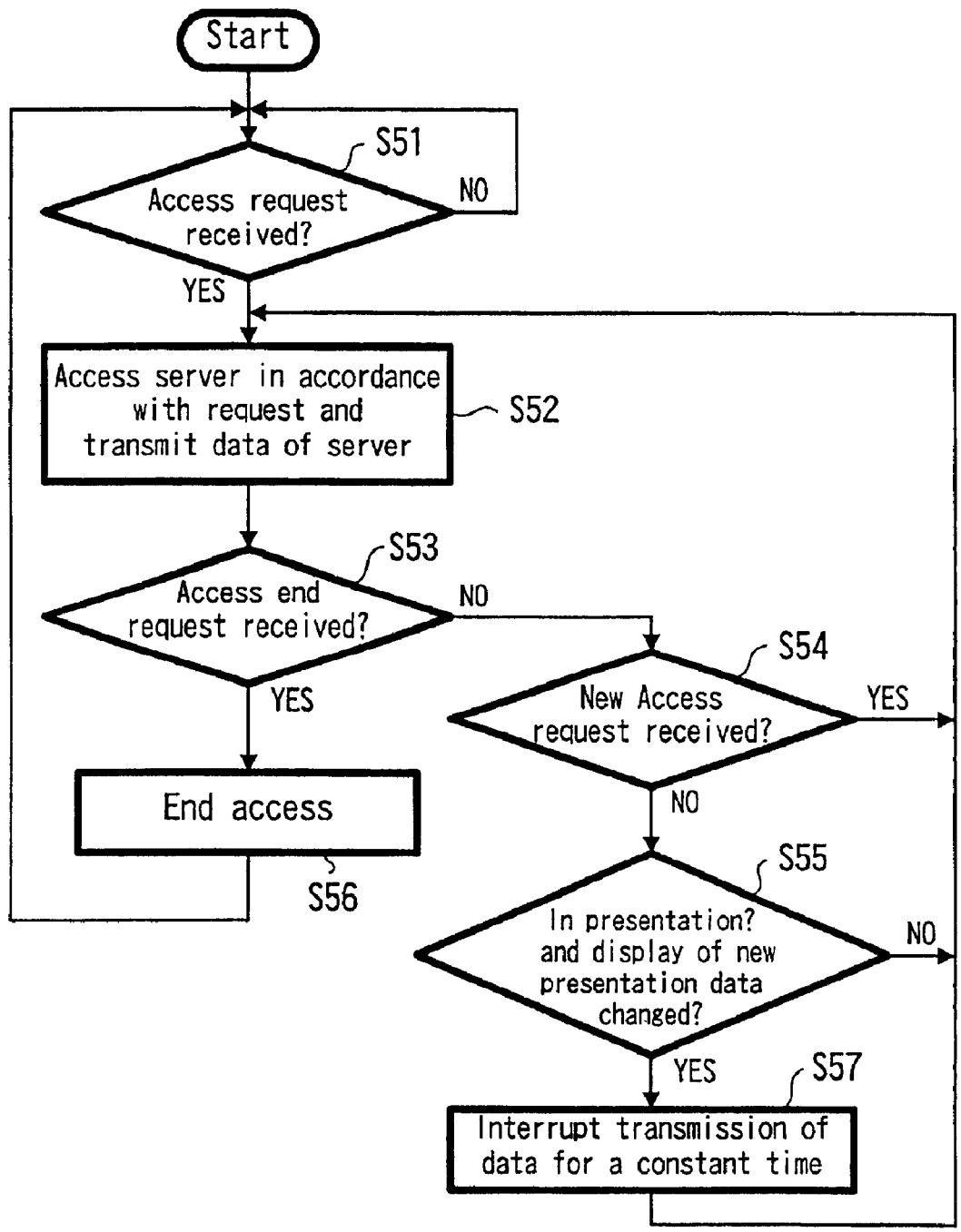
FIG. 15 is a flowchart to which reference will be made in explaining a part of the processing contents of the "host program".
Figure 16:
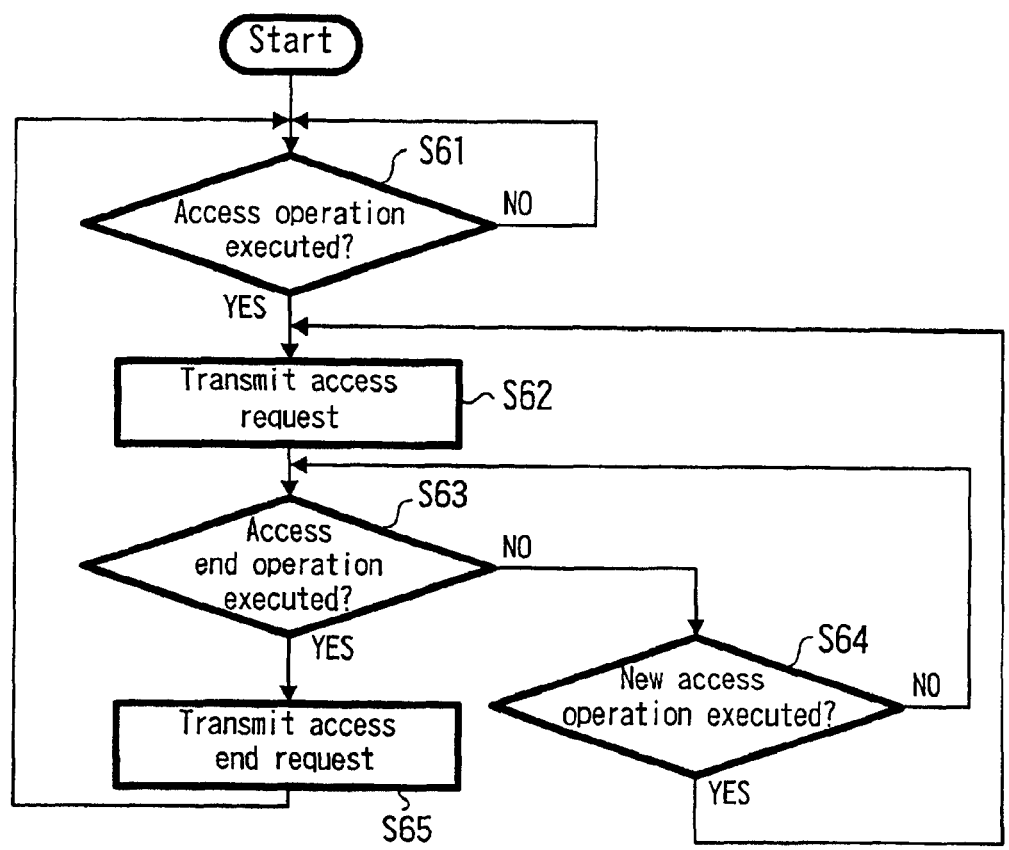
FIG. 16 is a flowchart to which reference will be made in explaining a part of the processing contents of the "client program".

FIGS. 15 and 16 show the contents of these processing steps on the "host program" and the "client program", respectively. As shown in FIG. 15, it is determined by the network interface card 1 of the host 11 (1) whether or not the access request to the server of the wire LAN or the WWW server of the Internet are received from the individual clients 11 (2) to 11 (n) (step S51). The requests are transmitted and received in accordance with the polling system shown in FIG. 7 in the processing steps shown in FIGS. 15 and 16.

As shown in FIG. 16, it is determined by the network interface cards 1 of the clients 11 (2) to 11 (n) whether or not the notebook size personal computers of the clients 11 (2) to 11 (n) concerned access the server of the wire LAN or the WWW server of the Internet (step S61). If this operation is executed, then the access request to this server is transmitted to the host 11 (1) (step S62).

As shown in FIG. 15, if the access request from the client is received, then the network interface card 1 of the host 11 (1) accesses the server (the server of the wire LAN or the WWW server of the Internet) in accordance with this access request, and transmits the data transmitted from this server to that client (step S52).

As a consequence, data of the server of the wire LAN or data of the WWW server of the Internet is individually displayed on the notebook size personal computer of that client.

If the presentation is now being executed by the processings shown in FIGS. 13 and 14, data of this server is transmitted to that client at the step S52 instead of the presentation data that has been transmitted so far. Consequently, instead of the presentation data that has been displayed so far, data of this server (i.e., data different from the presentation data displayed on the notebook size personal computers of the host 11 (1) and other clients and the projector 12) is displayed on the notebook size personal computer of that client.

While executing the step S52, it is repeatedly determined by the network interface card 1 of the host 11 (1) whether or not an access end request from that client is received (step S53), whether or not the new access request is received (step S54) and whether or not the presentation is now being executed and whether or not the display of new presentation data has changed (switching of a page and the like) (step S55).

As shown in FIG. 16, after having transmitted the access request, it is repeatedly determined by the network interface cards 1 of the clients 11 (2) to 11 (n) whether or not the notebook size computers of the clients 11 (2) to 11 (n) concerned end the access (step S63) and whether or not they access a new server (step S64).

Then, if it is determined that the access end operation is executed, then the access end request is transmitted to the host 11 (1) (step S65), and control goes back to the step S61. If it is determined that the operation for accessing another server is executed, then control goes back to the step S62.

As shown in FIG. 15, if the access end request is received, then the network interface card 1 of the host 11 (1) ends the access of the server (step S56), and control goes back to the step S51. As a result, when the presentation is being executed, the presentation data is again displayed on the notebook size personal computer of that client.

If a new access request is received, then this time the server is accessed at the step S52 in accordance with the access request, and data is transmitted to the client.

If the presentation is now being executed and the display of the new presentation data is changed, then the transmission of data from the server is interrupted for a fixed time (step S57).

While the transmission of the data from the server is being interrupted at the step S57, the presentation data is transmitted to that client by the processings shown in FIGS. 13 and 14. Thus, each time the display of the presentation data is changed, the changed presentation data is displayed on the notebook size personal computer of the client, which displays data of the server of the wire LAN and data of the WWW server of the Internet, during a fixed time.

The processing steps shown in FIGS. 15 and 16 are continuously executed until the network interface card 1 is ejected from the notebook size personal computer or the operating system of the notebook size personal computer is terminated.

Owing to the processing steps shown in FIGS. 15 and 16, when the participants of the conference want to examine data of the server of the wire LAN and data of the WWW server of the Internet before they make a presentation, they can examine the data of that server by the client.

While the participant is examining data from another participant's presentation, since the changed presentation data is displayed during a constant time each time the display of the presentation data is changed, the presentation data can be prevented from being overlooked by the participant.

As described above, in this wireless LAN conference system, since the network interface card 1 is available at the conference hall and the clients each comprise a notebook size personal computer brought by the participants of the conference and this network interface card 1, the network of the clients can be set without imposing a burden upon the participants of the conference, and the system can be constructed without increasing the costs of equipment of the conference hall, unlike the case in which personal computers are installed at the respective seats as fixed equipment.

Moreover, since the host also is comprised of the same network conference terminal device as that of the client, an exclusive device need not be provided as the host, and hence the costs of equipment of the conference hall can be further reduced.

In addition, since the presentation application software is stored in the network interface card 1, even when the participant of the conference brings a notebook size personal computer in which the presentation application software is not installed, the notebook size personal computer also can display the presentation data.

Further, this presentation application software can be activated automatically. Accordingly, the participant of the conference need not execute any operations to activate this presentation application software, and hence a burden imposed on the participants can be further reduced.

Since the host and the clients are connected by the wireless LAN, a wire transmission medium such as a coaxial cable and an optical fiber cable need not be laid over the conference hall, and hence the cost of equipment can be reduced from this viewpoint. Further, the position of the wireless LAN conference terminal device 11 within the conference hall is not fixed, unlike the case in which the wire transmission medium is laid over (accordingly, the layout of seats is not fixed), and hence the layout of seats can be determined freely.

Moreover, the LAN conference system can be constructed without changing the wire LAN which is constructed in advance within a building in which a conference hall is prepared.

In the above example, the processing instructions of the "host/client decision program" is such that the first wireless LAN conference terminal device 11 to which the network interface card 1 is attached, and in which the operating system of the notebook size personal computer is activated, in the conference hall is the host.

However, the processing instructions of the "host/client decision program" is not limited thereto and may be processing instructions in which any one of the wireless LAN conference terminal devices 11 is determined as the host by a proper method (e.g., a picture for urging the participant to select the host or the client is displayed on the notebook size personal computer and the host or the client is determined in accordance with the operations of the notebook size personal computer).

While the projector is provided in the above example, as another example, the wireless LAN conference system may be constructed without providing the projector and presentation data may be displayed only on the notebook size personal computers of the host and the clients.

Since the projector is connected only to the host through the external display output terminal of the notebook size personal computer in the above example, when another participant other than the coordinator of the conference makes a presentation, the host transmits presentation data, transmitted from the client to the host, to the projector.

Figure 17:
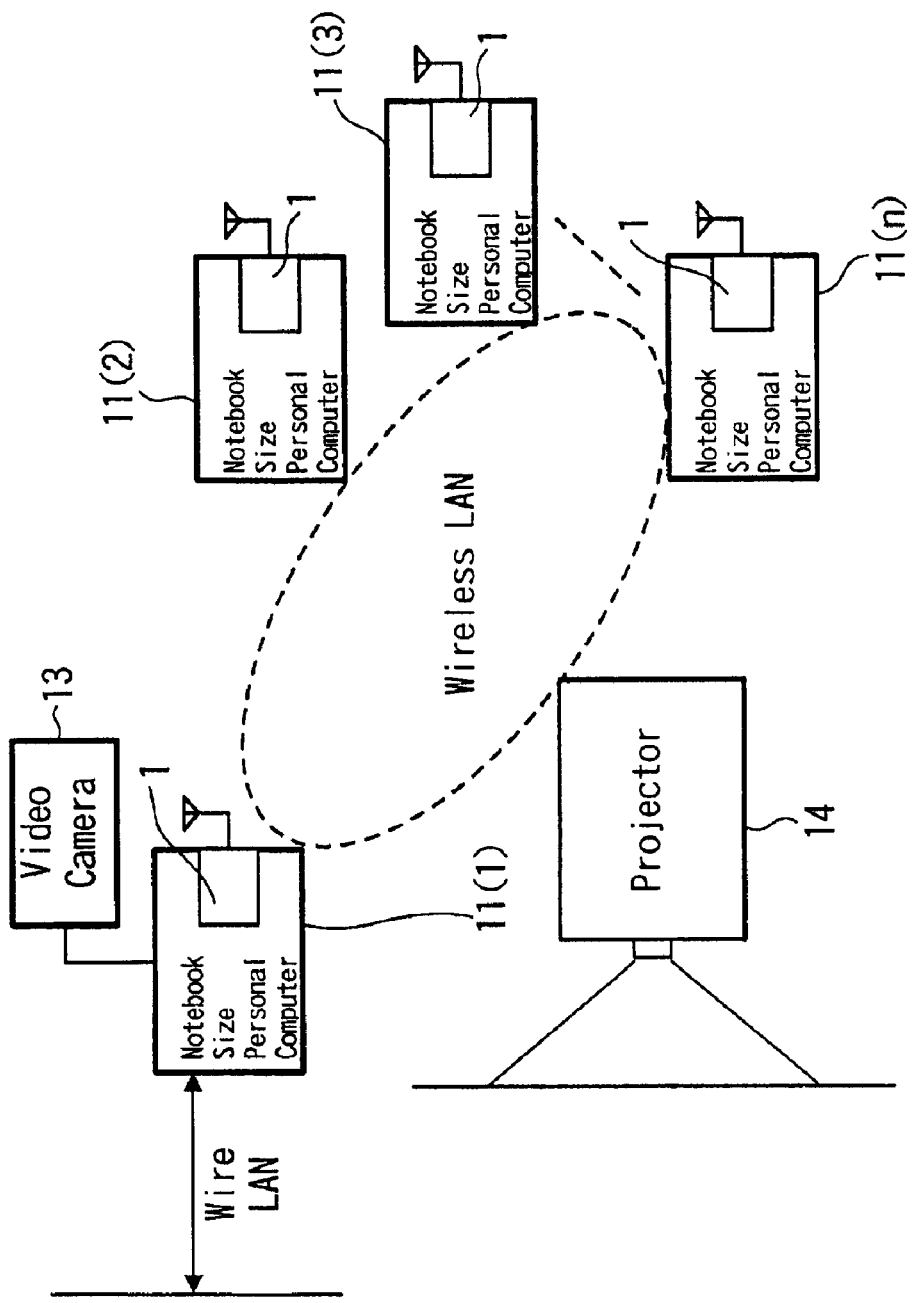
FIG. 17 is a diagram showing other example of an overall arrangement of a network conference system according to the present invention.
Figure 18:
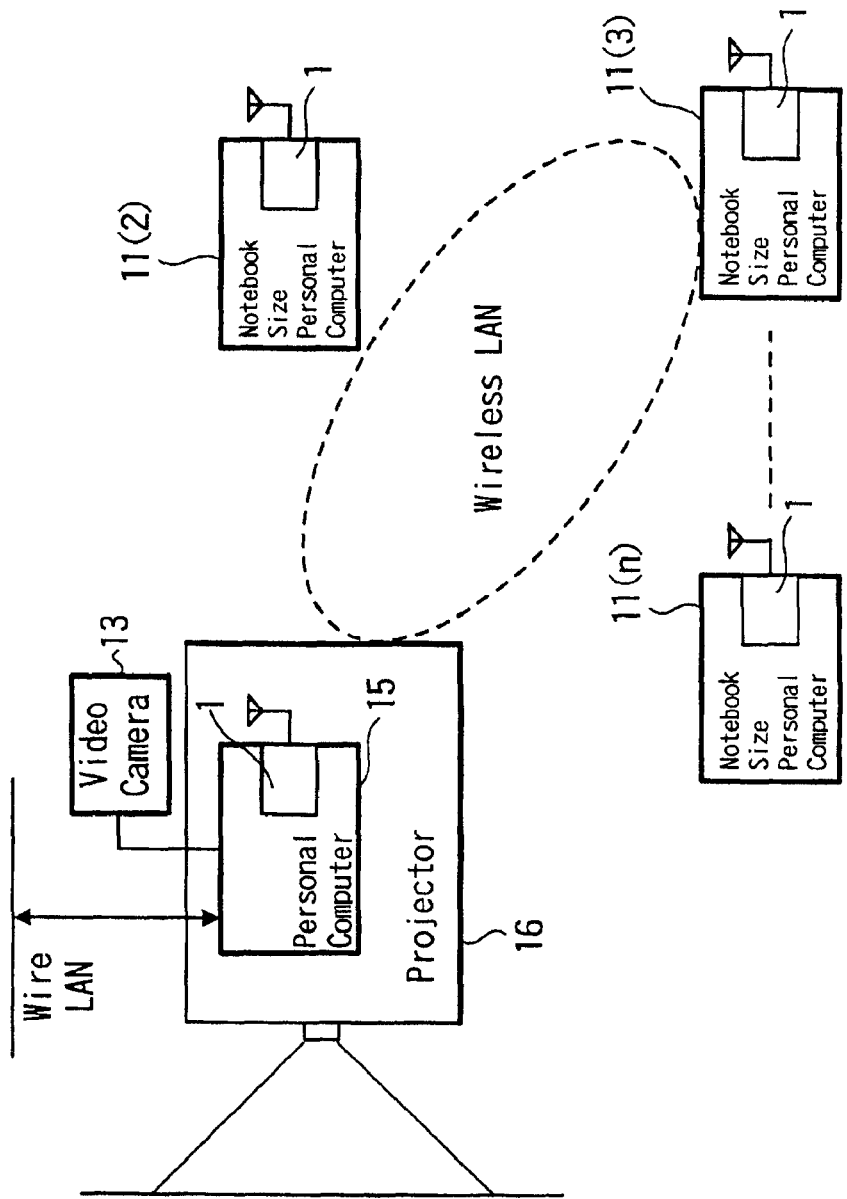
FIG. 18 is a diagram showing a further example of an overall arrangement of a network conference system according to the present invention.
Figure 19:
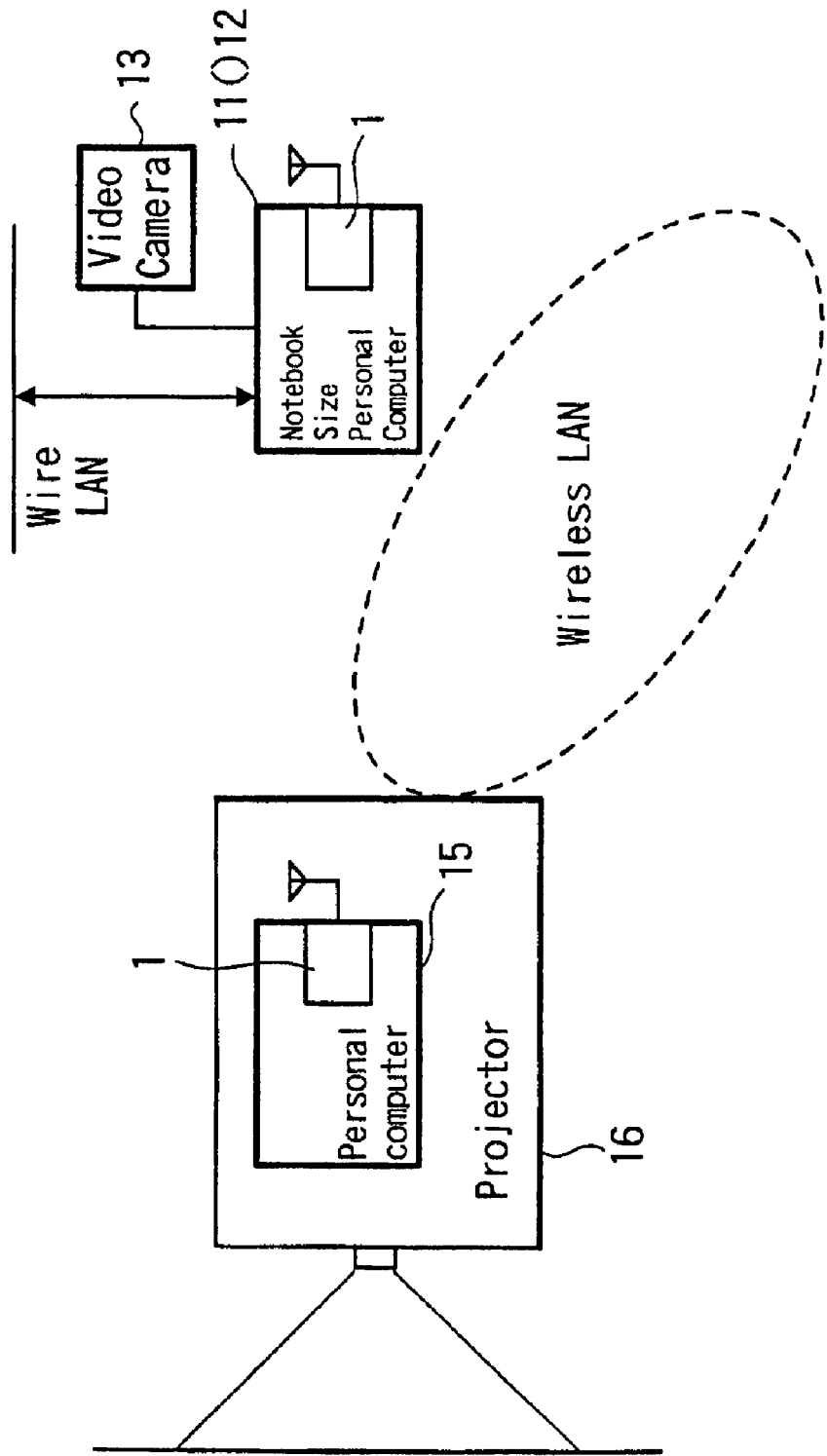
FIG. 19 is a diagram showing yet a further example of an overall arrangement of a network conference system according to the present invention.

However, as another example, as shown in FIG. 17, by using a projector that can be connected to the wireless LAN (e.g., projector with a personal computer, which can be connected to the wireless LAN, attached thereto) 14, the presentation data may directly be transmitted to the projector 14 through the wireless LAN from the clients 11 (2) to 11 (n) (the host 11 (1) also may transmit the presentation data to the projector 14 through the wireless LAN) (in FIG. 17, parts common to those of FIG. 5 are marked with the identical reference numerals and this relationship applies for the following FIGS. 18, 19 as well).

In the above example, the host and the projector are provided as separate sections. However, as other example, as shown in FIG. 18, there may be provided a projector 16 with a personal computer 15 having a PC card slot attached thereto. The network interface card 1 may be attached to this personal computer 15 and this personal computer may serve as the host, whereby the projector may also serve as the host.

In the wireless LAN conference system shown in FIG. 18, the same presentation data as that displayed on the projector 16 is directly transmitted to the clients 11 (2) to 11 (n) from the projector 16 through the wireless LAN and thereby is displayed on the clients 11 (2) to 11 (n). Similarly to the wireless LAN conference system shown in FIG. 17, presentation data may directly be transmitted to the projector 16 from the clients 11 (2) to 11 (n) through the wireless LAN and thereby such presentation data can be displayed on the projector 16.

Further, in the example shown in FIG. 18, when the presentation data displayed on the projector 16 can be easily seen from all seats and only one participant makes a presentation, as shown in FIG. 19, for example, there is provided only one wireless LAN conference terminal device (client) 11 (2). Then, this wireless LAN conference terminal device 11, the wire LAN and the video camera 13 may be connected together, whereby the participant which will make a presentation gets the presentation right by this client 11 (2) from beginning to end and may transmit the presentation data to the projector 16.

In the above example, not only the "client program" but also the "host/client decision program" and the "host program" are stored in the network interface card, whereby the notebook size personal computer with the network interface card attached thereto may serve as the host.

However, as another example, the "host/client decision program" and the "host program" may not be stored in the network interface card and the "client program" may constantly be activated based on the fact that the network interface card is attached to the notebook size personal computer. In that case, as the host, one may use an ordinary (not relating to the present invention) network interface card attached to the personal computer in which the "host program" and the presentation application software are installed (in the examples shown in FIGS. 18 and 19, the "host program" and the presentation application software may be installed on the personal computer attached to the projector and the ordinary network interface card may be attached to a personal computer).

In the above example, the "host program" and the "client program" contain the processing steps by which the client gets the presentation right. However, when the participant of the conference does not need to transmit the presentation data by the client (e.g., announcement meeting in which a specific person makes a presentation in a one-sided fashion), the "host program" and "client program" need not contain these processing steps.

In the above example, the presentation application software is stored in the network interface card. However, as another example, the presentation application software may not be stored in the network interface card, and the network interface card may be attached to the notebook size personal computer in which the presentation application software was previously installed.

In the above example, the network interface card is attached to the notebook size personal computer, thereby resulting in the client and the host being constructed. However, the present invention is not limited thereto, and the client and the host may be constructed by attaching the network interface card to suitable information terminal devices to which the PC card can be attached (other personal computers than the notebook size personal computer, personal digital assistants which are highly-sophisticated electronic notes, printers, image writing devices having a built-in camera, etc.).

In the above example, the network interface card adopts the radio frequency system as a wireless LAN system. However, as other example, an infrared system may be adopted as the wireless LAN system.

In the above example, the network interface card is applied to a wireless LAN conference system. However, the present invention is not limited thereto, and the network interface card may be applied to other uses than the wireless LAN conference system. However, in that case, the network interface card may transmit and receive data through a wire LAN.

In the above example, the present invention is applied to a network interface card that is based on the PCMCIA standards. However, the present invention is not limited thereto, and the present invention may be applied to proper card type (including thin-chip type) network interface cards which can be attached to the information terminal devices.

The present invention is not limited to the above examples and it is needless to say that the present invention may take various arrangements without departing from the scope thereof.

As described above, according to the network interface card of the present invention, there is achieved the effect that the network setting for connecting the information terminal device such as the personal computer to the LAN can be executed without imposing a burden on the users.

Accordingly, in the conference using the LAN, for example, if theses network interface cards are prepared in the conference hall and these network interface cards are attached to the information terminal devices such as the notebook size personal computers brought by the participants of the conference, then the network setting can be executed on the assumption that the participants are going to attend the conference without imposing a burden upon the participants. Moreover, the cost of equipment of the conference hall can be prevented from being increased unlike the case in which the information terminal devices such as the personal computers are attached to the respective seats as fixed equipment.

According to this network interface card, since the host of the LAN also comprises the information terminal device to which this network interface card is attached, there is achieved the effect that the LAN system can be constructed without providing an exclusive-device as the host. Therefore, in the conference using the LAN, for example, the cost of equipment of the conference hall can be further reduced.

According to this network interface card, in the conference using the LAN, for example, the participants of the conference can make a presentation without leaving their seats.

According to this network interface card, there are achieved effects that the host can accurately receive requests from a plurality of clients whose network settings were completed through the wireless LAN and that the host can accurately receive the setting information request through the wireless LAN.

According to this network interface card, in the conference using the LAN, for example, there is achieved the effect in which the information terminal device in which the presentation application software is not installed can display the present application data. Moreover, since the participant of the conference need not execute operations to activate the presentation application software, there is achieved the effect in which a burden imposed upon the participants can be alleviated more.

Next, according to the network conference terminal device of the present invention, there are achieved the effects in which the network setting configuration, on the assumption that the participants are going to attend the conference using the wireless LAN, can be executed without imposing a burden upon the participants and in which the cost of equipment of the conference hall can be prevented from being increased unlike the case in which the information terminal devices are provided at the respective seats as fixed equipment.

According to the network conference terminal device, since the host of the wireless LAN also comprises this network conference terminal device, there is achieved the effect in which the wireless LAN conference system can be constructed without providing the exclusive-device as the host. Therefore, the cost of equipment of the conference hall can be further reduced.

According to this network conference terminal device, in the conference using the wireless LAN, for example, the participants of the conference can make a presentation without leaving their seats.

According to this network conference terminal device, there are achieved effects in which the host can accurately receive requests from a plurality of clients whose network settings were completed and in which the host can accurately receive the setting information request to set the network.

According to this network conference terminal device, in the conference using the wireless LAN, for example, there is achieved the effect in which the information terminal device in which the presentation application software is not already installed can still display the presentation data. Moreover, since the participant of the conference need not execute operations to activate the presentation application software, there is achieved the effect in which a burden imposed upon the participants can be alleviated more.

Next, according to the network conference system of the present invention, there are achieved the effects in which the network setting can be executed without imposing a burden upon the participants and in which the system can be constructed without increasing the cost of equipment of the conference hall.

According to the network conference system, since the host also comprises the same network conference terminal device as that of the client, there is achieved the effect in which the exclusive-device need not be provided as the host so that the cost of equipment of the conference hall can be suppressed more.

According to this network conference system, the participants of the conference can make a presentation without leaving their seats.

According to this network conference system, there are achieved the effects in which the host can accurately receive requests from a plurality of clients in which the network setting was completed and in which the host can accurately receive the request of the setting information for setting the network.

According to this network conference system, there is achieved the effect in which the client or the host using the information terminal device in which the presentation application software is not installed can display the presentation data. Since the participant of the conference need not execute operations to activate the presentation application software, a burden imposed upon the participant can be further reduced.

Next, according to another network conference system of the present invention, there are achieved the effects in which the network setting of the client can be executed without imposing a burden upon the participants of the conference, the system can be constructed without increasing the cost of equipment of the conference hall and in which the participants can make a presentation without leaving their seats.

According to another network conference system, there are achieved the effects in which the same presentation data as the presentation data displayed on the image display device can directly be transmitted from the image display device through the wireless LAN to the client and can be displayed on the client and in which the presentation data can directly be transmitted from the client through the wireless LAN to the image display device and such presentation data can be displayed on the image display device.

Further, according another network conference system, there are achieved the effects in which the image display device (host) can accurately receive the requests from a plurality of clients in which the network setting was completed and in which the image display device can accurately receive the setting information request to set the network.

Furthermore, according to another network conference system, there is achieved the effect in which the client using the information terminal device in which the present application software is not installed and the image display device can display the presentation data. Since the participant of the conference need not execute operations to activate the presentation application software, there is achieved the effect in which a burden imposed upon the participants can be alleviated more.

What is claimed is:

1. A network interface card that is attachable to a computer terminal device, the card comprising:
   a card body having a network interface to connect the computer terminal device to a local area network;
   a network configuration manager that sends a configuration request to a host server of the local area network, wherein upon receiving the request from the network configuration manager, the host server sends network configuration information to the network configuration manager, such that the computer terminal is automatically configured to operate on the local area network based on the configuration information; and
   a processor that determines whether the computer terminal device should be configured as a host or a client of the local area network, wherein if the computer terminal device is a host, then the processor sends the network configuration information to the network configuration manager, otherwise the processor sends the request to the host server on the local area network.

2. The network interface card of claim 1, further comprising presentation application software stored on the card for controlling and displaying presentation data.

3. The network interface card of claim 2, wherein the computer terminal device automatically activates application software stored on a hard disk, and the network interface card allows the computer terminal device to recognize the network interface card as a hard disk so that the presentation application software is automatically loaded by the computer terminal device.

4. The network interface card of claim 1, wherein the processor determines that the computer terminal device is a host server based on whether the network interface card receives an inhibiting command from the local area network, wherein if the network interface card does not receive an inhibiting command, the computer terminal device is configured as a host and sends out an inhibiting command on the local area network, otherwise if the network interface card does receive an inhibiting command, the computer terminal device is configured as a client.

5. The network interface card of claim 1, wherein the processor sends a request to the host of the local area network in order to get a presentation right, wherein once the presentation right is obtained, presentation data is transmitted to the host and other clients on the local area network.

6. The network interface card of claim 1, further comprising a wireless local area network interface to connect the computer terminal device to a wireless local area network, wherein the network interface card requests the network configuration information at the end of a polling cycle.

7. A network conference terminal device having a network interface card attached to a computer terminal device, the computer terminal device capable of displaying and controlling presentation data, the network interface card comprising:
   a card body having a network interface to connect the computer terminal device to a local area network;
   a network configuration manager that sends a configuration request to a host server of the local area network, wherein upon receiving the request from the network configuration manager, the host server sends network configuration information to the network configuration manager, such that the computer terminal is automatically configured to operate on the local area network based on the configuration information; and
   a processor that determines whether the computer terminal device should be configured as a host or a client of the local area network, wherein if the computer terminal device is a host, then the processor sends the network configuration information to the network configuration manager, otherwise the processor sends the request to the host server on the local area network.

8. The network conference terminal device of claim 7, wherein the network interface card further comprising presentation application software stored on the card for controlling and displaying presentation data.

9. The network conference terminal device of claim 8, wherein the computer terminal device automatically activates application software stored on a hard disk, and the network interface card allows the computer terminal device to recognize the network interface card as a hard disk so that the presentation application software is automatically loaded by the computer terminal device.

10. The network conference terminal device of claim 7, wherein the processor determines that the computer terminal device is a host server based on whether the network interface card receives an inhibiting command from the local area network, wherein if the network interface card does not receive an inhibiting command, the computer terminal device is configured as a host and sends out an inhibiting command on the local area network, otherwise if the network interface card does receive an inhibiting command, the computer terminal device is configured as a client.

11. The network conference terminal device of claim 7, wherein the processor sends a request to the host of the local area network in order to get a presentation right, wherein once the presentation right is obtained, presentation data is transmitted to the host and other clients on the local area network.

12. The network conference terminal device of claim 7, wherein the network interface card further comprises a wireless local area network interface to connect the computer terminal device to a wireless local area network, wherein the network interface card requests the network configuration information at the end of a polling cycle.

13. A network conference system comprising:
   a host server of a wireless local area network;
   a client of the wireless local area network, wherein the client includes a computer terminal device having an attached network interface card, the network interface card comprising:
   a card body having a network interface to connect the computer terminal device to a local area network;
   a network configuration manager that sends a configuration request to a host server of the local area network, wherein upon receiving the request from the network configuration manager, the host server sends network configuration information to the network configuration manager, such that the computer terminal is automatically configured to operate on the local area network based on the configuration information; and
   a processor that determines whether the computer terminal device should be configured as a host or a client of the local area network, wherein if the computer terminal device is a host, then the processor sends the network configuration information to the network configuration manager, otherwise the processor sends the request to the host server on the local area network.

14. The network conference system of claim 13, wherein the network interface card further comprising presentation application software stored on the card for controlling and displaying presentation data.

15. The network conference system of claim 14, wherein the computer terminal device automatically activates application software stored on a hard disk, and the network interface card allows the computer terminal device to recognize the network interface card as a hard disk so that the presentation application software is automatically loaded by the computer terminal device.

16. The network conference system of claim 13, wherein the processor determines that the computer terminal device is a host server based on whether the network interface card receives an inhibiting command from the local area network, wherein if the network interface card does not receive an inhibiting command, the computer terminal device is configured as a host and sends out an inhibiting command on the local area network, otherwise if the network interface card does receive an inhibiting command, the computer terminal device is configured as a client.

17. The network conference system of claim 13, wherein the processor sends a request to the host of the local area network in order to get a presentation right, wherein once the presentation right is obtained, presentation data is transmitted to the host and other clients on the local area network.

18. The network conference system of claim 13, the network interface card requests the network configuration information at the end of a polling cycle.

19. A method of configuring a computer terminal to operate on a local area network in order to display and control presentation data, the method comprising:
   installing a network interface card in the computer terminal;
   determining whether the computer terminal is a host server or a client of the local area network based on whether the network interface card receives an inhibiting command from the local area network, wherein if the network interface card does not receive an inhibiting command, the computer terminal device is automatically configured as a host server of the local area network and sends out an inhibiting command on the local area network, otherwise if the network interface card does receive an inhibiting command, the computer terminal device is configured as a client;
   if the computer terminal is a client, sending a configuration request from the network interface card to the host server of the local area network, wherein upon receiving the configuration request, the host server sends network configuration information to the network interface card, such that the computer terminal is automatically configured to operate as a client on the local area network based on the configuration information; and
   executing a presentation application program, stored on the network interface card, on the computer terminal.

20. The method of claim 19, further comprising:
   sending a request to the host of the local area network in order to get a presentation right, wherein once the presentation right is obtained, presentation data is transmitted to the host and other clients on the local area network.

* * * * *